United States Patent
Whitehouse et al.

(10) Patent No.: US 11,952,144 B2
(45) Date of Patent: Apr. 9, 2024

(54) AIRCRAFT CONTROL SURFACE ELEMENT MONITORING SYSTEM

(71) Applicant: Moog Wolverhampton Limited, Wolverhampton (GB)

(72) Inventors: Paul D. Whitehouse, Wolverhampton (GB); Neil A. Venables, Bewdley (GB); Graham K. Towers, Leicester (GB); Robert P. Gerbetz, Waukegan, IL (US)

(73) Assignee: Moog Wolverhampton Limited, Wolverhampton (GB)

( * ) Notice: Subject to any disclaimer, the term of this patent is extended or adjusted under 35 U.S.C. 154(b) by 506 days.

(21) Appl. No.: 17/420,706

(22) PCT Filed: Jan. 8, 2020

(86) PCT No.: PCT/EP2020/050292
§ 371 (c)(1),
(2) Date: Jul. 5, 2021

(87) PCT Pub. No.: WO2020/144221
PCT Pub. Date: Jul. 16, 2020

(65) Prior Publication Data
US 2022/0097866 A1    Mar. 31, 2022

Related U.S. Application Data

(60) Provisional application No. 62/790,279, filed on Jan. 9, 2019, provisional application No. 62/951,362, filed on Dec. 20, 2019.

(51) Int. Cl.
*B64D 45/00* (2006.01)
*B64D 43/00* (2006.01)

(52) U.S. Cl.
CPC ......... *B64D 45/0005* (2013.01); *B64D 43/00* (2013.01); *B64D 2045/001* (2013.01)

(58) Field of Classification Search
CPC ................ B64D 45/0005; B64D 43/00; B64D 2045/001
See application file for complete search history.

(56) References Cited

U.S. PATENT DOCUMENTS

| | | |
|---|---|---|
| 5,680,124 A | 10/1997 | Bedell et al. |
| 5,686,907 A | 11/1997 | Bedell et al. |

(Continued)

FOREIGN PATENT DOCUMENTS

| | | |
|---|---|---|
| EP | 1029784 A1 | 8/2000 |
| EP | 2322431 B1 | 8/2013 |

(Continued)

OTHER PUBLICATIONS

International Search Report and Written Opinion, dated May 29, 2020, corresponding to International Patent Application No. PCT/EP2020/050292, 12 pages.

(Continued)

*Primary Examiner* — Octavia Davis Hollington
(74) *Attorney, Agent, or Firm* — Harter Secrest & Emery LLP

(57) ABSTRACT

An aircraft moveable element monitoring system is provided. An exemplary aircraft moveable element monitoring system includes a signal generator (108), a signal transmitter coil (110) electrically connected to the signal generator (108); a signal detector (112); a signal receiver coil (114) electrically connected to the signal detector (112); and one or more moveable element signal transmission units (115a-c). An exemplary moveable element signal transmission unit (115) includes a first signal transmission unit coil and a second signal transmission unit coil, the first signal transmission unit coil being electrically connected to the second signal transmission unit coil. Each moveable element signal transmission unit is configured to be installed on a respective moveable element of an aircraft. The signal transmitter coil, (Continued)

the one or more moveable element signal transmission units and the signal receiver coil form an inductively coupled transmission line. The signal generator is configured to provide an electrical signal to the signal transmitter coil and the signal detector is configured to detect the electrical signal via the signal receiver coil. The signal detector is further configured to determine a condition of the one or more moveable elements by comparing the detected electrical signal to a predetermined signal characteristic.

20 Claims, 12 Drawing Sheets

(56) References Cited

U.S. PATENT DOCUMENTS

| | | | |
|---|---|---|---|
| 6,382,566 B1 * | 5/2002 | Ferrel | B64D 45/0005 244/215 |
| 6,867,696 B2 * | 3/2005 | Becken | H04B 5/48 340/572.7 |
| 6,930,489 B2 | 8/2005 | Schievelbusch et al. | |
| 7,708,226 B2 | 5/2010 | Schievelbusch | |
| 7,945,425 B2 | 5/2011 | Marx et al. | |
| 8,115,649 B2 * | 2/2012 | Moy | B64D 45/0005 340/686.2 |
| 8,646,346 B2 | 2/2014 | Hubberstey et al. | |
| 9,073,643 B2 | 7/2015 | Moy et al. | |
| 9,656,764 B2 | 5/2017 | Jones | |
| 10,988,238 B2 | 4/2021 | Schlipf et al. | |
| 11,015,665 B2 * | 5/2021 | Ankney | F16D 65/16 |
| 2017/0073082 A1 | 3/2017 | Ungar et al. | |
| 2018/0319483 A1 * | 11/2018 | Mayer | B64C 9/24 |
| 2021/0261269 A1 * | 8/2021 | Thomas | B64C 9/22 |

FOREIGN PATENT DOCUMENTS

| | | | |
|---|---|---|---|
| EP | 2555979 B1 | | 6/2016 |
| EP | 3505451 A1 | | 7/2019 |
| KR | 20110027208 A | * | 3/2011 |
| WO | 2007065622 A1 | | 6/2007 |
| WO | 2012085546 A1 | | 6/2012 |
| WO | 2015006673 A1 | | 1/2015 |

OTHER PUBLICATIONS

REA (1993) "Boeing 777 High Lift Control System," IEEE AES Systems Magazine: 15-21.

* cited by examiner

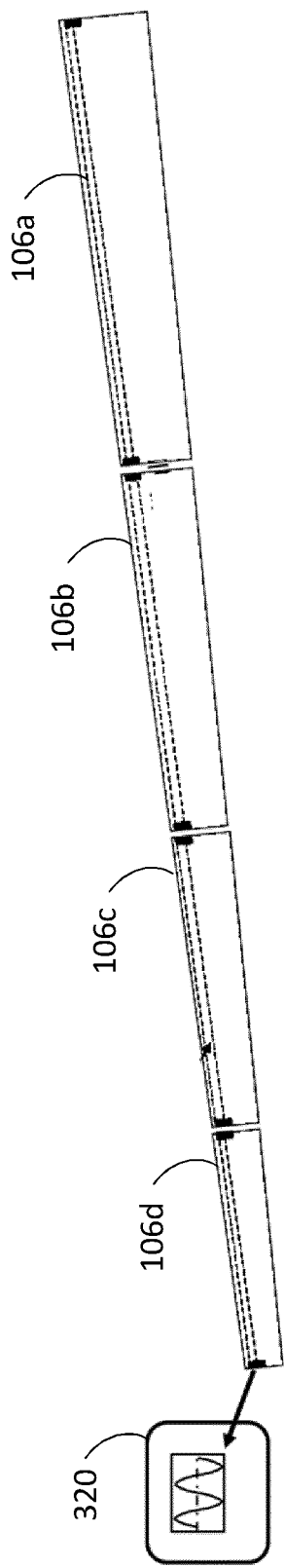
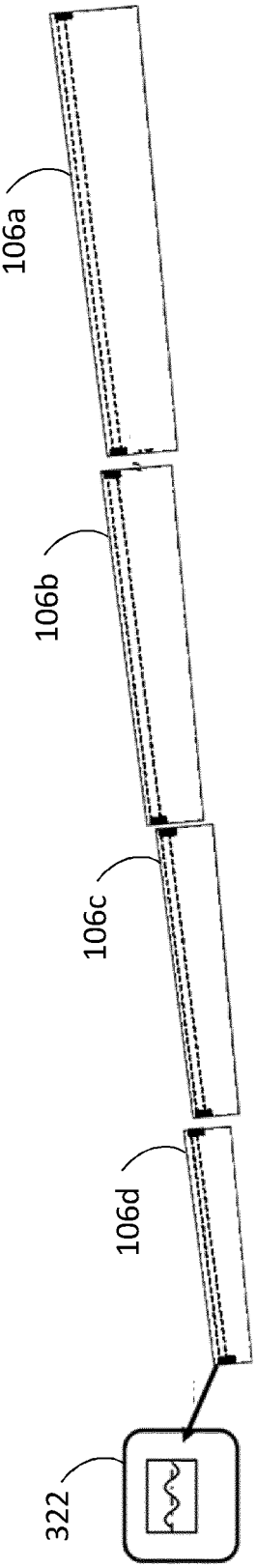
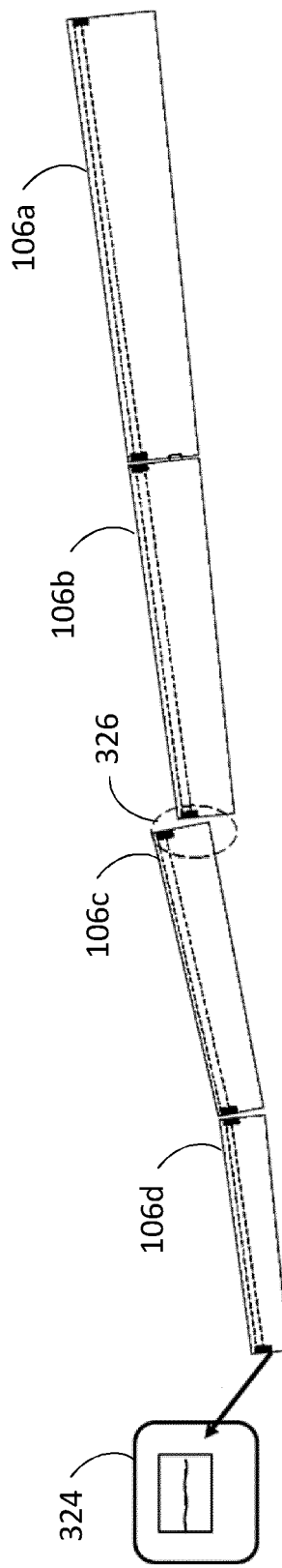
Figure 3A
Figure 3B
Figure 3C

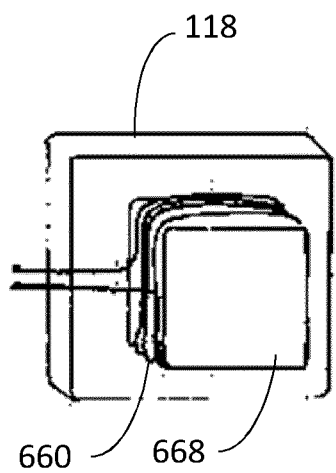
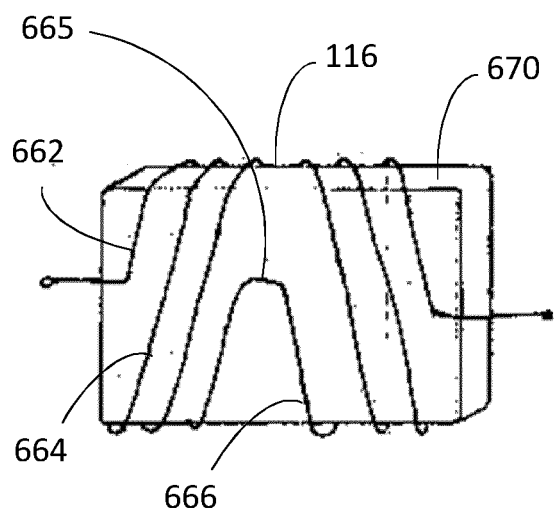
Figure 6A    Figure 6B
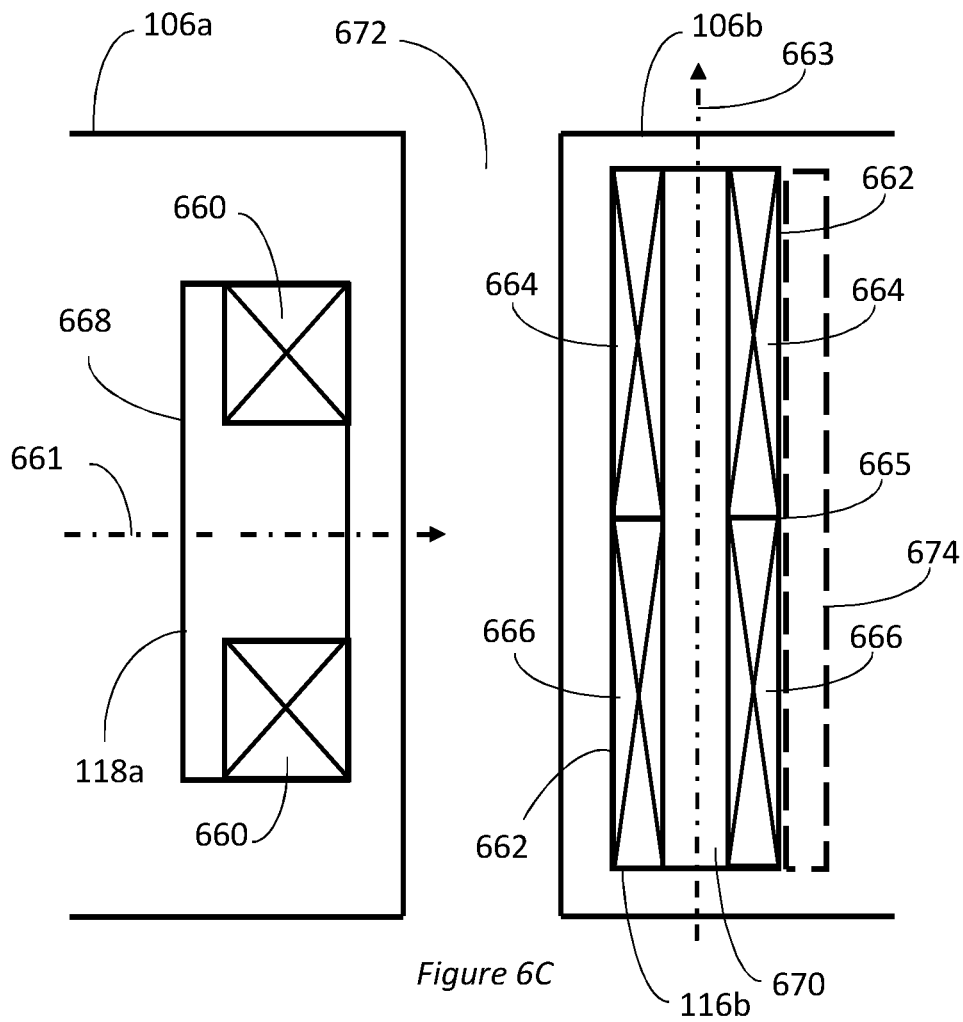
Figure 6C

AIRCRAFT CONTROL SURFACE ELEMENT MONITORING SYSTEM

TECHNICAL FIELD

The present disclosure relates generally to a control surface skew and/or loss detection system. More specifically, the present disclosure relates to a wireless skew and/or loss detection system for use in chains of actuable aircraft parts, such as the slats and flaps of aircraft wing structures.

BACKGROUND

Aircraft wings typically comprise a series of actuable control surface elements. These control surface elements are moveable relative to the fixed wing structure in order to alter the aerodynamic characteristics of the wing. Such control surface elements include leading edge devices such as slats, and trailing edge devices such as flaps.

Typically, control surface elements such as flaps and slats are actuated at either of their span-wise ends by two separate actuators. It is conceivable that either of these actuators could fail, thus resulting in inconsistent actuation and skew or loss of the relevant control surface. It is important that this skew or loss be detected and the relevant systems shut down and the pilot of the aircraft notified.

Various methods have been proposed for providing detection of skew and/or loss of control surfaces. One such system described in U.S. Pat. No. 5,680,124 proposes a cable which is coupled to each of the control surface elements on the leading and/or trailing edge which cable is pulled in the event of a skew or control element loss. A moveable detector with a proximity sensor is provided coupled to the cable such that any skew and/or loss can be detected. This detector is positioned on the endmost flap or slat and is coupled to the flap/slat electronics unit (FSEU) in the fuselage via electric cables running from the control surface element through the fixed wing structure into the fuselage and to the FSEU.

A first problem with this known system is that because the cable must be anchored at the endmost control surface element, skew at the outboard end of that element cannot be detected by this system.

A further problem with the system of U.S. Pat. No. 5,680,124 is that wiring is required between the moveable control surface element on which the detector is mounted to the fixed wing structure and to the fuselage. Effectively translating wiring between a moveable structure and a fixed structure is non-trivial. Furthermore, such wiring will be exposed to external elements. In addition, leading edge control surface elements such as slats need to have anti-icing features. Such features generate a range of adverse temperature conditions which can potentially degrade the reliability of the sensors mounted on these control surface elements over time.

An alternative known method for detecting skew and/or loss of a control surface element involves the use of proximity sensors designed to detect the presence or absence of a corresponding target mounted to a track/cable used to actuate a flap/slat. One such system is described in EP2322431 B1. Because separate sensors are provided for each control surface element actuation means, the system is complex and installation on an aircraft can be non-trivial. For example, in such systems separate wiring is typically need for each proximity sensor. Additionally, these systems can involve electronic cabling/components being exposed (with associated concerns relating to environmental conditions and anti-icing provisions as discussed above).

A further alternative known method for detecting skew and/or loss of a control surface element involves the provision of a wire or optical fibre that runs through each control surface element in a sequence of control surface elements. In the event that skew is introduced between control surface elements, the wire/optical fibre is configured to break (for example by engaging with a cutter). Examples of such systems can be found in U.S. Pat. No. 6,930,489 B2 and EP1029784 B1. Such systems require some form of repair, replacement or reconfiguration following the breaking of the wire/optical fibre during a skew/loss situation.

It is noted that, of the methods above, all those that are capable of detecting skew between individual slats require the provision of some form of wire/cable running between adjacent control surface elements, and may require repair or reconfiguration following positive detection of a skew/loss event. Furthermore, in practice such known systems are often difficult to install on aircraft, in some cases requiring that all control surface elements are already in situ and appropriately aligned before installation and rigging of the monitoring system can begin.

SUMMARY

The present disclosure provides for an aircraft moveable element monitoring system. In an exemplary embodiment, the aircraft moveable element monitoring system includes a signal generator, a signal transmitter coil electrically connected to the signal generator, a signal detector, a signal receiver coil electrically connected to the signal detector, and one or more moveable element signal transmission units. Each moveable element signal transmission unit comprises a first signal transmission unit coil and a second signal transmission unit coil, the first signal transmission unit coil being electrically connected to the second signal transmission unit coil. Each moveable element signal transmission unit is configured to be installed on a respective moveable element of an aircraft. The signal transmitter coil, the one or more moveable element signal transmission units and the signal receiver coil form an inductively coupled transmission line. For example, each coil in the system is configured to be proximate to another coil under normal (e.g. no skew/loss) conditions, such that a series of pairs of inductively coupled coils are provided, across which an electrical signal can be transmitted.

For example, the first signal transmission unit coil of a respective moveable element signal transmission unit may be positioned so as to be inductively coupled with either the signal transmitter coil or the second signal transmission unit coil of a different moveable element signal transmission unit installed on an adjacent moveable element, and the second signal transmission unit coil of a respective moveable element signal transmission unit may be positioned so as to be inductively coupled with either the signal receiver coil or the first signal transmission unit coil of a different moveable element signal transmission unit installed on an adjacent moveable element, thereby forming the inductively coupled transmission line.

The signal generator is configured to provide an electrical signal to the signal transmitter coil and the signal detector is configured to detect the electrical signal (e.g. after having been transmitted across one or more moveable element signal transmission unit) via the signal receiver coil. The signal detector is further configured to determine a condition (e.g. whether there is no misalignment/misalignment within acceptable operating parameters, or if there is unacceptable misalignment, such as skew or loss of a moveable element) of the one or more moveable elements by comparing the detected electrical signal to a predetermined signal characteristic/value (for example, comparing the detected signal strength to a predetermined threshold or value and/or monitoring the detected signal for occurrence of a characteristic property).

Advantageously, the system is resistant to the environmental effects, as there is no need to run any additional cables, electronic wiring, or other components between the moveable elements (e.g. control surface elements such as slats or flaps), and between moveable elements and the main body of the wing structure. Moreover, the system enables improved ease of installation, maintenance and repair, as each signal transmission unit can be installed within a respective moveable element before the moveable element is itself installed on the aircraft. In addition, the system advantageously monitors moveable element condition at the end of the moveable element actuation power transmission sequence, rather than part way along the power transmission sequence.

In an exemplary embodiment, one or more of the signal receiver coil and the one or more first signal transmission unit coils each comprises a winding of wire, wherein the winding comprises a first portion in which the wire is wound in a clockwise sense about a first axis in a first direction, and a second portion in which the wire is wound in an anti-clockwise sense relative to the first axis in the first direction. In these embodiments, the signal transmitter coil and the one or more second signal transmission unit coils may each comprise wire wound about a second axis, the second axis substantially perpendicular to the first axis. Advantageously, this arrangement improves flux linkage between coils, improving the signal transmission characteristics of the system.

Alternatively, or in addition, one or more of the signal receiver coil, the signal transmitter coil, the one or more first signal transmission unit coils, and the one or more second signal transmission unit coils each comprises a core (e.g. made from a ferromagnetic or ferrimagnetic material such as ferrite), wherein the core has a substantially C-shaped profile. Advantageously, this arrangement also improves flux linkage between coils, improving the signal transmission characteristics of the system.

In an exemplary embodiment, each of the one or more moveable element signal transmission units comprises a rectification circuit and an LC resonance oscillator circuit (for example a tank circuit such as a Colpitts oscillator or Hartley oscillator), wherein for each moveable element signal transmission unit: the rectification circuit is configured to rectify an electrical input from the first signal transmission unit coil and provide the rectified electrical input to the LC resonance oscillator circuit; and the LC resonance oscillator circuit is configured to modify the rectified electrical input so as to provide an oscillating electrical output to the second signal transmission unit coil. Advantageously, this arrangement improves signal transmission across the gaps between moveable elements.

In an exemplary embodiment, the system further comprises at least one additional signal transmitter coil and at least one additional signal receiver coil, wherein: the signal transmitter coil and the signal receiver coil are configured for installation on a fixed part of an aircraft at locations corresponding to a first moveable element configuration; and the at least one additional signal transmitter coil and the at least one additional signal receiver coil are configured for installation on the fixed part of an aircraft at locations corresponding to at least one additional moveable element configuration. For example, the additional signal transmitter coil(s) and signal receiver coil(s) can be located to inductively couple with moveable element signal transmission units when the moveable elements are at specific stages of deployment.

In an exemplary embodiment, at least one (e.g. each) moveable element signal transmission unit further comprises one or more capacitors connected (in series and/or in parallel) to the first signal transmission unit coil and the second signal transmission unit coil. The signal generator is configured such that the provided electrical signal has a frequency corresponding to a resonant frequency of the at least one moveable element signal transmission unit. Advantageously, this allows for increased current through the signal transmitter coil of the at least one moveable element signal transmission unit, thereby inducing a larger current in the signal receiver coil of an adjacent moveable element signal transmission unit, while reducing/minimising overall power consumption of the system.

In an exemplary embodiment, there is also provided an aircraft control surface element system comprising: an aircraft wing structure comprising a fixed part and one or more control surface elements, the one or more control surface elements configured to be moveable relative to the fixed part; and the aircraft moveable element monitoring system above. Each of the one or more control surface elements comprises a moveable element signal transmission unit. The aircraft moveable element monitoring system is configured to determine a condition of the one or more control surface elements.

In another exemplary embodiment, there is also provided an aircraft comprising an aircraft control surface element system.

BRIEF DESCRIPTION OF THE DRAWINGS

The accompanying drawings are incorporated herein as part of the specification. The drawings described herein illustrate embodiments of the present disclosure and are illustrative of selected principles and teachings thereof. However, the drawings do not illustrate all possible implementations of the presently disclosed subject matter and are not intended to limit the scope of the present disclosure in any way.

FIGS. 3A-3C show schematic cross sections of an aircraft wing including a control surface element monitoring system under different conditions in accordance with an embodiment of the present disclosure.

FIGS. 6A-6D show schematic representations of transmitting and receiving coils in accordance with an embodiment of the present disclosure.

DETAILED DESCRIPTION

Figure 1:
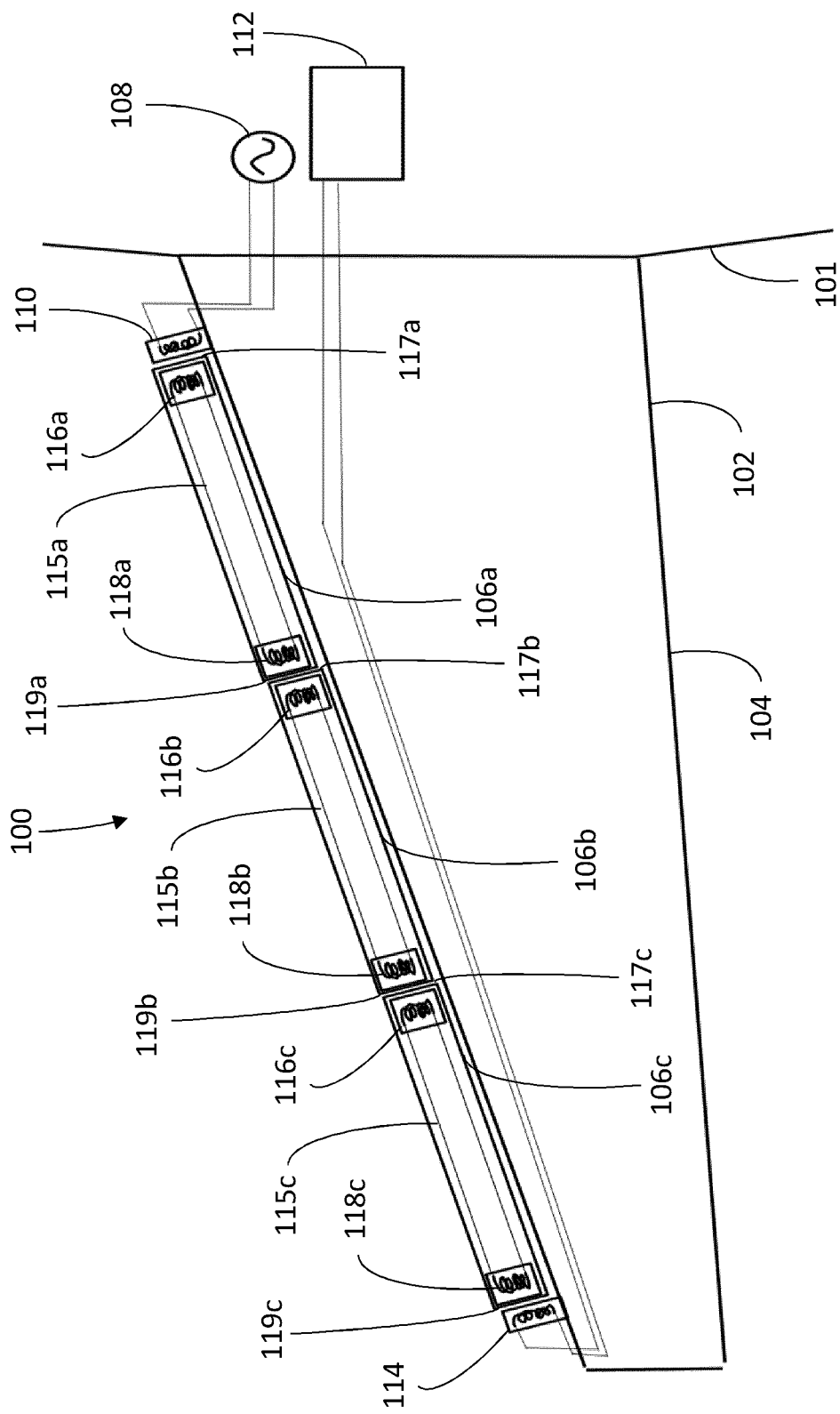
FIG. 1 shows a schematic cross section of an aircraft wing including a control surface element monitoring system in accordance with an embodiment of the present disclosure.

It is to be understood that the invention may assume various alternative orientations and step sequences, except where expressly specified to the contrary. It is also to be understood that the specific assemblies and systems illustrated in the attached drawings and described in the following specification are simply exemplary embodiments. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

In the embodiments described below, the invention is described in relation to the detection of skew and/or loss of control surface elements. The present disclosure is applicable to a sequence/chain of high lift leading edge and trailing edge control surface elements, including slats, Krueger Flaps and flaps. However, it will be appreciated that the principles described herein are also applicable to detecting misalignment, skew and/or loss of any sequence/chain of moveable/actuable aircraft parts.

FIG. 1 shows a schematic representation of part of an aircraft including a control surface element monitoring system 100 in accordance with an embodiment of the present disclosure. FIG. 1 shows a portion of an aircraft fuselage 101, and an aircraft wing structure 102 comprising a fixed part 104 and a chain/sequence of moveable control surface elements 106a, 106b, 106c. In an embodiment, the moveable control surface elements 106a, 106b, 106c may be, but are not limited to, a sequence/chain of slats, flaps, and/or Krueger Flap devices. As shown in the example of FIG. 1, the wing structure 102 has three control surface elements 106a, 106b, 106c, however it will be appreciated that any suitable number of control surface elements (just one or more than one) can be provided in the control surface element monitoring system 100, depending on the function of the control surface elements, the size of the aircraft, etc. The control surface elements 106a, 106b, 106c are optionally disposed on either the leading or trailing edge of the wing structure 102. Each control surface element 106a, 106b, 106c is configured to move relative to the fixed part 104. In one example, the control surface elements 106a, 106b, 106c are slats, Krueger Flaps or flaps. In an embodiment, in the case of the control surface elements 106a, 106b, 106c being slats, they may be actuated via a rack and pinion arrangement connected to a torque shaft, the torque shaft being rotatably connected to the fixed part 104 and driven by a power drive unit (PDU) located in the fuselage 101.

The control surface element monitoring system 100 includes a signal generator 108 electrically connected to a signal transmitter coil 110. In an embodiment, the signal generator 108 and signal transmitter coil 110 are disposed on the fixed part 104 as shown in FIG. 1—advantageously, this avoids the need for any wired connections that might be required by the signal generator 108 (for example power, data and/or control cables) to cross a gap between the main body of the wing structure 102 and a control surface element 106a, 106b, 106c. In another embodiment, one or both of the signal generator 108 and signal transmitter coil 110 are instead disposed within a further control surface element. The signal generator 108 is configured to produce a time varying AC or DC output signal. In an embodiment, the signal transmitter coil 110 may be an antenna comprising an inductor.

The control surface element monitoring system 100 also includes a signal detector 112 electrically connected to a signal receiver coil 114. In an embodiment, at least the signal detector 112 is either part of a central computing unit, or communicatively connected to a separate central computing unit within the aircraft. In an embodiment the signal detector 112 and signal receiver coil 114 are disposed on the fixed part 104 as shown in FIG. 1—advantageously, this avoids the need for any wired connections that might be required by the signal generator 108 (for example power, data and/or control cables) to cross a gap between the main body of the wing structure 102 and a control surface element 106a, 106b, 106c. In another embodiment, one or both of the signal detector 112 and signal receiver coil 114 are instead disposed within a further control surface element. In an embodiment, the signal receiver coil 114 may be an antenna comprising an inductor.

The control surface element monitoring system 100 also comprises control surface element signal transmission units 115a, 115b, 115c comprising a first signal transmission unit coil 116a, 116b, 116c and a second signal transmission unit coil 118a, 118b, 118c. Each first signal transmission unit coil 116a, 116b, 116c is electrically connected to the corresponding second signal transmission unit coil 118a, 118b, 118c within the corresponding control surface element 106a, 106b, 106c (for example, by providing wired connections between corresponding ends of the first signal transmission unit coil 116a, 116b, 116c and the second signal transmission unit coil 118a, 118b, 118c within each control surface element signal transmission units 115a, 115b, 115c). In an embodiment, the first signal transmission unit coil 116a, 116b, 116c and/or the second signal transmission unit coil 118a, 118b, 118c may be an antenna comprising an inductor.

Each of the control surface elements 106a, 106b, 106c includes a corresponding control surface element signal transmission unit 115a, 115b, 115c. In an embodiment, the signal transmission units 115a, 115b, 115c comprise electronic modules configured to be positioned within one or more respective moveable elements to transmit an electrical signal across the one or more moveable elements. As shown in FIG. 1, the first and second signal transmission unit coils 116a, 116b, 116c, 118a, 118b, 118c are positioned such that, in the presence of an electrical current, when the control surface elements 106a, 106b, 106c are not in a skew/loss condition, each first and second signal transmission unit coil 118a, 118b, 118c, 118a, 118b, 118c is inductively coupled to another coil. In an embodiment, the control surface element monitoring system 100 comprises no wires running across the gaps between adjacent control surface elements 106a, 106b, 106c, and between control surface elements 106a, 106b, 106c and the fixed part 104.

In an embodiment, the first signal transmission unit coil 116a, 116b, 116c of each control surface element signal transmission unit 115a, 115b, 115c is positioned proximate to a first lateral edge 117a, 117b, 117c of the corresponding control surface element 106a, 106b, 106c. Similarly, the second signal transmission unit coil 118a, 118b, 118c is positioned proximate to a second lateral edge 119a, 119b, 119c of the corresponding control surface element 106a, 106b, 106c, the second lateral edge 119a, 119b, 119c opposing the first lateral edge 117a, 117b, 117c. This allows the first signal transmission unit coil 116a, 116b, 116c of each control surface element signal transmission unit 115a, 115b, 115c to be inductively coupled with the second signal transmission unit coil 118a, 118b, 118c of a different control surface element signal transmission unit 115a, 115b, 115c installed on an adjacent control surface element 106a, 106b, 106c. For example, as shown in FIG. 1, first signal transmission unit coil 116c of control surface element signal transmission unit 115c is inductively coupled with second signal transmission unit coil 118b of control surface element signal transmission unit 115b.

The control surface element signal transmission units 115a, 115c in the endmost control surface elements 106a, 106c in the chain/sequence, inductively couple to either the signal transmitter coil 110 or the signal receiver coil 114. As shown in FIG. 1, the signal transmitter coil 110 is positioned on the fixed part 104 at a location proximate to the first lateral edge 117a of a first control surface element 106a in the chain. Similarly, the signal receiver coil 114 is positioned on the fixed part 104 at a location proximate to the second lateral edge 119c of a last control surface element 106c in the chain. In this way the signal transmitter coil 110 is inductively coupled to the first signal transmission unit coil 116a in the first control surface element 106a, and the signal receiver coil 114 is inductively coupled to the second signal transmission unit coil 118c in the last control surface element 106c.

In this manner, the signal transmitter coil 110, the one or more control surface element signal transmission units 115a, 115b, 115c and the signal receiver coil 114 form an inductively coupled transmission line.

In use, the signal generator 108 generates a time-varying electrical signal, for example a sinusoidal voltage signal. The signal is provided to the transmitter coil 110. In the event that the control surface elements 106a, 106b, 106c are in a normal configuration (i.e. no control surface element is missing 106a, 106b, 106c, and there is no unacceptably high level of skew between control surface elements 106a, 106b, 106c), then the signal is transmitted to the signal detector 112 by means of the inductive coupling between the signal transmitter coil 110 and the first signal transmission unit coil 116a of the first control surface 106a, between successive corresponding second signal transmission unit coils 118a, 118b and first signal transmission unit coils 116b, 116c, and between the second signal transmission unit coil 118c of a last control surface element 106c and the signal receiver coil 114. In this normal condition, the signal as received by the detector 112 has a relatively high strength (e.g. a relatively high peak voltage).

In the event of an unacceptable skew of one of the control surface elements 106a, 106b, 106c one or both of the first signal transmission unit coil 116a, 116b, 116c and the second signal transmission unit coil 118a, 118b, 118c in that control surface element becomes misaligned with respect to a next coil in the chain/sequence (for example, the first signal transmission unit coil/second signal transmission unit coil in an adjacent control surface element, or the signal transmitter coil 110 or receiver coil 114). At such a misalignment, the inductive coupling between coils is reduced. As a result, the signal as received by the detector 112 has a relatively low strength (e.g. a relatively low peak voltage), or potentially no signal is received by the detector 112 at all. Other properties of the signal as received by the detector 112 may also change as a result of the reduced inductive coupling between coils, such as, but not limited to, the phase of the signal.

A relatively low received signal strength or no received signal would also occur in the event that one of the control surface elements 106a, 106b, 106c was missing, or had failed to actuate or actuated unexpectedly (in the case that the sequence of control surface elements 106a, 106b, 106c were independently actuated). Similarly, any form of misalignment between control surface elements 106a, 106b, 106c (e.g. skew, damage, deformation, etc.), would also result in a relatively low received signal strength or no received signal at the detector 112.

Accordingly, the signal as detected at the detector 112 is used to determine whether the chain of control surface elements 106a, 106b, 106c, is in a normal condition or if at least one of the control surface elements 106a, 106b, 106c is misaligned (e.g. in a skew condition or otherwise misaligned), has been lost, or has otherwise not actuated deployed as expected. In some embodiments, the signal strength is compared to a predetermined threshold value indicative of a maximum acceptable skew within the control surface element monitoring system 100 (for example, the peak voltage or peak root mean squared "RMS" voltage can be compared to a threshold value)—if the threshold is not exceeded, then it is determined that unacceptable skew and/or loss of one or more control surface elements 106a, 106b, 106c has occurred. Alternatively, other characteristic properties of the signal, such as a signal profile over time or a phase of the signal at the signal detector 112, can be compared to predetermined signal characteristics (e.g. one or more threshold values, a predetermined voltage profile over time, an original phase of the signal as produced by the signal generator 108, etc.), wherein the comparison indicates whether the signal as received at the detector 112 is as expected for a normal configuration, or whether skew/loss of a control surface element 106a, 106b, 106c has occurred.

In some embodiments, the detector 112 includes a local processor and the determination of whether the chain of control surface elements 106a, 106b, 106c is in a normal condition or if an unacceptable control surface element misalignment/loss is present is performed by the local processor. In other embodiments, the detector 112 provides data describing the detected signal to a central computing unit, and the determination of whether the chain of control surface elements 106a, 106b, 106c is in a normal condition or if an unacceptable control surface element misalignment/loss is present is performed at the central computing unit.

Advantageously, the control surface element monitoring system 100 allows the monitoring of any number of control surface elements in a sequence (for example a sequence of leading edge slats or trailing edge flaps), without the need to run any additional cables, electronic wiring, or other components between the control surface elements, and between control surface elements and the main body of the wing structure. The electronic components of the control surface element monitoring system 100 can be located entirely within the fuselage 101, the fixed part 104 of the wing 102 and the control surface elements 106a, 106b, 106c respectively. As a result, no electronic part of the control surface element monitoring system 100 need be exposed to the elements, reducing the sensitivity of the control surface element monitoring system 100 to environmental conditions on the ground (e.g. when de-icing) and in flight.

Further, the control surface element monitoring system 100 is easy to install (and indeed retrofit) on an aircraft. Each signal transmission unit 115a, 115b, 115c can be installed within a respective control surface element 106a, 106b, 106c before the control surface element is itself installed on the aircraft—unlike conventional systems, it does not require that a full sequence of control surface elements is already in situ on the aircraft. This also improves the ease with which maintenance and repair can be performed on individual control surface elements 106a, 106b, 106c, because it is not necessary to remove the entire skew monitoring arrangement in order to remove/access a particular control surface element 106a, 106b, 106c.

The modular nature of the control surface element monitoring system 100 (i.e. the fact that it uses a self-contained signal transmission unit 115a, 115b, 115c in each control surface element 106a, 106b, 106c) makes the control surface element monitoring system 100 easily scalable for aircraft wings comprising any number of control surface elements 106 in a sequence. It is also easy to remove any one signal transmission unit 115a, 115b, 115c, in the event that it requires maintenance.

A further benefit of the control surface element monitoring system 100 is that, by creating an inductively coupled signal line through the control surface elements 106, monitoring is being performed at the end of the power transmission sequence for control surface element 106 actuation. This is in contrast to known systems which infer the condition of control surface elements by monitoring a component part along the power transmission sequence (wherein the component part is not at the end of the power transmission sequence), rather than the control surface element themselves (e.g. techniques using proximity sensors to monitor the position of a control surface element track). The present control surface element monitoring system 100 is thus able to account for situations in which a skew is present, but does not manifest further down the power transmission line.

Figure 2A:
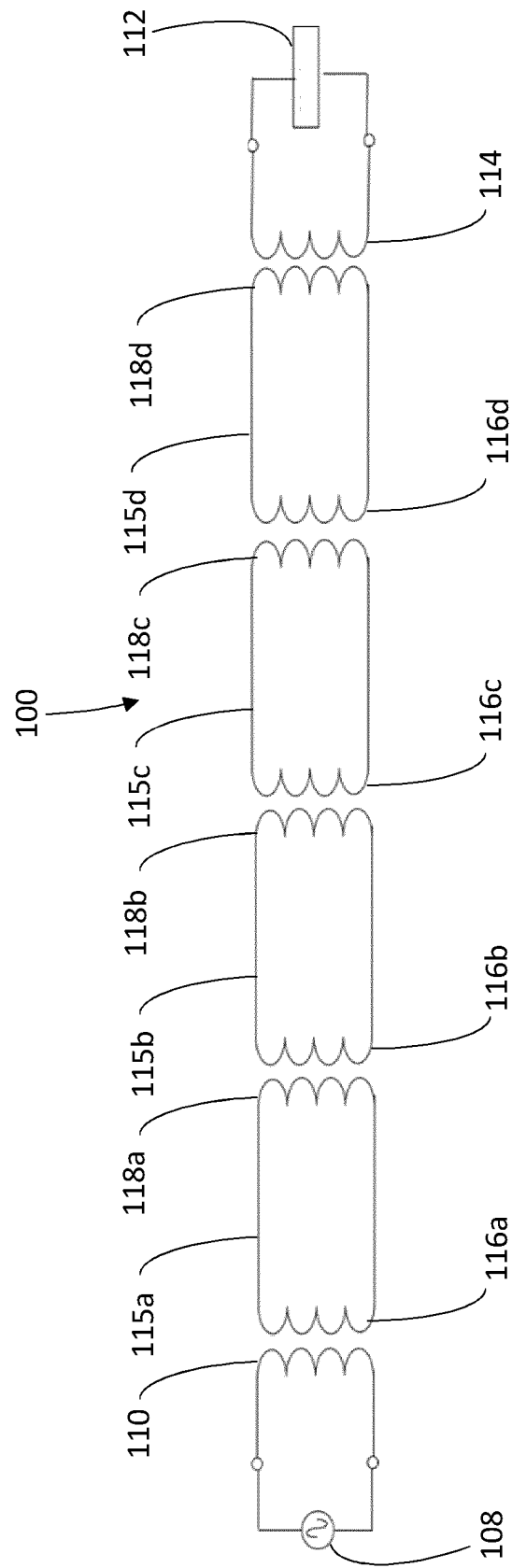
FIGS. 2A-2C show schematics of a control surface element monitoring system in accordance with an embodiment of the present disclosure.

FIG. 2A shows a schematic representation of electronic components in a control surface element monitoring system 100 according to an embodiment of the present disclosure, the system 100 as described above in relation to FIG. 1. The control surface element monitoring system 100 includes the signal generator 108, signal transmission coil 110, first signal transmission unit coils 116a, 116b, 116c, second signal transmission unit coils 118a, 118b, 118c, receiver coil 114 and signal detector 112. FIG. 2A shows an additional control surface element signal transmission unit 115d corresponding to an additional control surface element 106 in the sequence, including a first signal transmission unit coil 116d and a second signal transmission unit coil 118d. As noted above, any suitable number of control surface elements 106 (one or more) can be provided in the system 100, depending on the function of the control surface elements 106, the size of the aircraft, etc.

As shown in FIG. 2A, in an embodiment, the signal generator 108 may be an AC voltage source, for example configured to provide a sinusoidal voltage output signal. The provision of a substantially sinusoidal output is advantageous, as it allows the electrical signal to have a frequency suitable for transmitting the electrical signal across the gap between adjacent control surface elements, whilst reducing/avoiding any undesirable high frequency components. In an embodiment, the frequency of the signal is in the range 10 to 100 kHz. In another embodiment, the frequency of the signal may in the range of 20 to 50 kHz. Beneficially, such frequencies have been found to provide good signal inductive transmission between coils, whilst being sufficiently far removed from frequencies used for communication. In other embodiments, the signal generator 108 provides a different time varying electrical signal, but again the generated signal may have frequency components in the range 10 to 100 kHz, or 20 to 50 kHz.

Figure 2B:
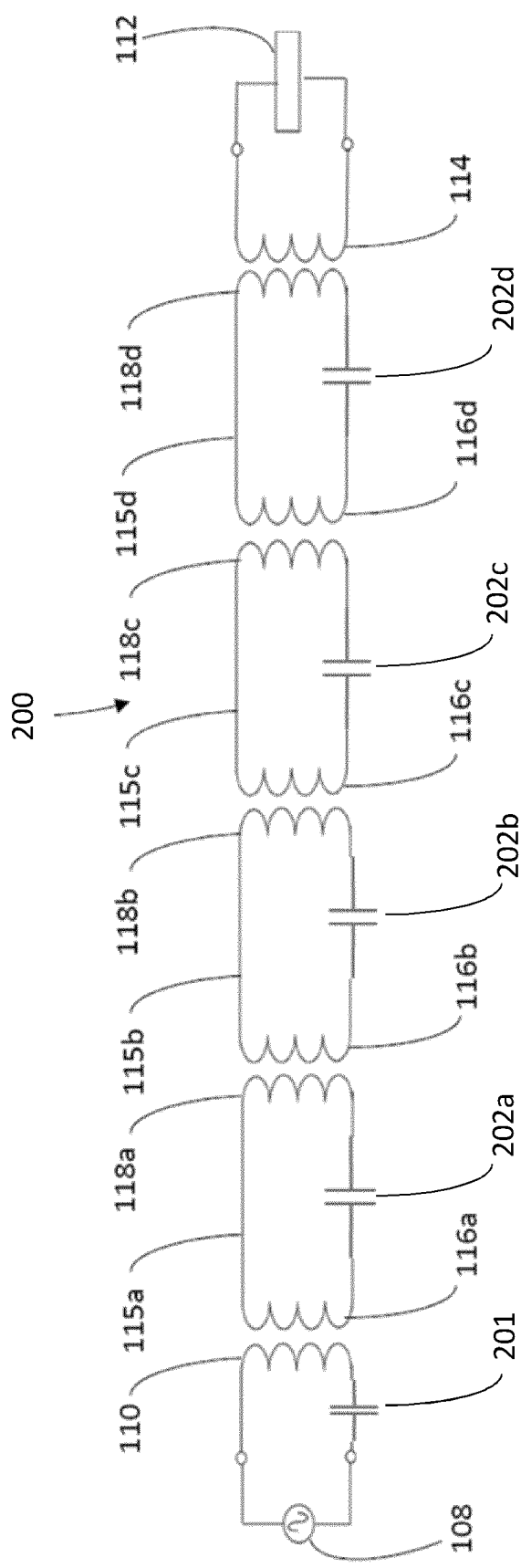

FIG. 2B shows a further schematic representation of electronic components in a control surface element monitoring system 200 according to an embodiment of the present disclosure. The system 200 is similar to that described above in relation to FIGS. 1 and 2A, and additionally includes one or more capacitors 201, 202a, 202b, 202c, 202d. Preferably a capacitor 201 is connected to the signal transmitter coil 110 and the signal generator 108, and a capacitor 202a, 202b, 202c, 202d is included in each of the control surface element signal transmission units 115a, 115b, 115c. Thus, the signal transmitter coil 110 and each of the first and second signal transmission unit coils 116a, 116b, 116c, 118a, 118b, 118c are connected to respective capacitors 201, 202a, 202b, 202c, 202d. As shown in FIG. 2B, each capacitor 201, 202a, 202b, 202c, 202d is shown connected in series with respective coils, however in some examples the capacitors 201, 202a, 202b, 202c, 202d may be connected in parallel. In further examples additional capacitors and/or inductors are also provided, connected either in series or parallel.

By including capacitors 201, 202a, 202b, 202c, 202d in the system 200, each control surface element signal transmission unit 115a, 115b, 115c, 115d advantageously forms a resonant circuit (due to the combination of the capacitance of respective capacitors 201, 202a, 202b, 202c, 202d with the inductance of the corresponding signal transmitter coil 110 or first and second signal transmission unit coils 116a, 116b, 116c, 116d, 118a, 118b, 118c, 118d). Selection of the capacitance of the capacitors 201, 202a, 202b, 202c, 202d, the inductance of the signal transmitter coil 110 and each of the first and second signal transmission unit coils 116a, 116b, 116c, 116d, 118a, 118b, 118c, 118d is such as to make each control surface element signal transmission unit 115a, 115b, 115c, 115d resonant with neighbouring control surface element signal transmission units 115a, 115b, 115c, 115d at the frequency selected for operation of the signal generator 108 (e.g. 50 kHz). By driving the system 200 at the resonant frequency (i.e. using signal generator 108 to produce an AC signal having the resonant frequency), the impedance of the system is reduced/minimised, meaning that current flow within each signal transmission unit 115a, 115b, 115c, 115d can be maximised for a given power input. Advantageously, increasing the current in the respective coils increases the magnetic field strength around the coils thereby improving the ability to transmit a signal across an air gap between coils. Thus, the use of the capacitors 201, 202a, 202b, 202c, 202d advantageously reduces power consumption whilst improving signal transmission.

Figure 2C:
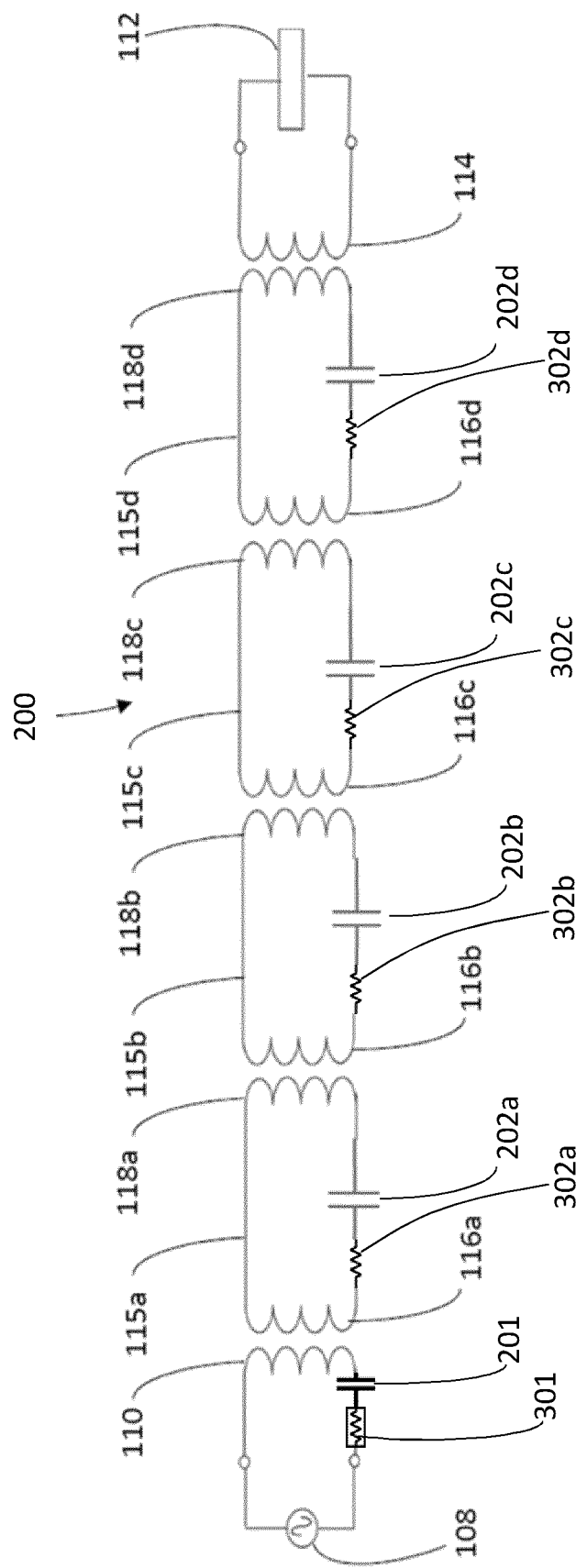

Optionally, as illustrated in FIG. 2C, the system 200 may further include one or more resistors 301, 302a, 302b, 302c, 302d in series and/or parallel connection with respective capacitors 201, 202a, 202b, 202c, 202d. By including the resistors 301, 302a, 302b, 302c, 302d, the resonant peak of the circuit is broadened (i.e. the half-width half maximum of the peak in current, plotted with respect to driving frequency, increases). Put differently, the range of driving frequencies around the resonant frequency that result in reduced impedance is increased. Advantageously, by broadening the resonant peak in this manner, the system 200 can accommodate shifts in the resonant frequency in one or more of the control surface element signal transmission units 115a, 115b, 115c, 115d (e.g. caused by small air gaps and mutual inductance).

The amount of electrical power required to operate the system successfully can be substantially reduced by the addition of capacitors in series or parallel to the signal transmitter coil and the moveable signal transmission units (slat or flap panels), thereby forming adjoining LC or LCC networks.

FIGS. 3A-C show schematic cross sections of an aircraft wing including the control surface element monitoring system 100, 200 under different conditions according to an embodiment of the present disclosure. FIG. 3 shows four control surface elements 106a, 106b, 106c, 106d, though a different number may alternatively be provided. The situation shown in FIGS. 3A-C may correspond to any particular degree of actuation of the control surface elements 106a, 106b, 106c, 106d. For example, the control surface elements 106a, 106b, 106c, 106d may be in a fully retracted configuration, a fully extended configuration or an intermediate configuration. Other elements of the system 100, 200 (such as the signal transmitter coil 110 and the signal receiver coil 114, etc.) have been omitted from FIGS. 3A-C in the interest of clarity of explanation.

In FIG. 3A, all control surface elements 106a, 106b, 106c, 106d are in perfect alignment. No control surface element 106 is missing, nor is there any skew or other misalignment between adjacent control surface elements 106. This represents an ideal case. In this case, there is good coupling between the signal transmitter coil 110, the signal transmission units 115a, 115b, 115c, 115d and the signal receiver coil 114, resulting in a relatively strong signal 320 being detected at the detector 112.

In FIG. 3B, the control surface elements 106a, 106b, 106c, 106d are not in perfect alignment, however the amount of misalignment is within acceptable operation parameters. In this case, the coupling between the signal transmitter coil 110, the signal transmission units 115a, 115b, 115c, 115d and the signal receiver coil 114 is not as good as in the ideal case, but is still sufficient to effectively transmit the electrical signal to the detector 112. In this case, the detected signal strength 322 is less than the ideal case, but may still satisfy an associated signal strength threshold indicating that any misalignment is within acceptable operation parameters.

Both the situations in FIGS. 3A and 3B can be considered "normal" conditions, in that they represent situations in which the alignment between control surface elements 106a, 106b, 106c, 106d is within acceptable operation parameters.

FIG. 3C shows the situation in which a skew condition has occurred. Two control surface elements 106b, 106c are misaligned relative to one another introducing a skew 326 between them. In this case, the coupling between the signal transmitter coil 110, the signal transmission units 115a, 115b, 115c, 115d and the signal receiver coil 114 is poor (i.e. worse than the coupling for any case in which misalignment is within acceptable operation parameters). In particular, the inductive coupling between the second signal transmission unit coil 118b of the second control surface element 106b in the sequence, and the first signal transmission unit coil 116c of the second control surface element 106c is reduced as compared to a normal condition.

In this case, the detected signal strength 324 is relatively low, and does not satisfy a signal strength threshold, thus indicating that there is misalignment that is not within acceptable operation parameters.

In the event that it is determined that unacceptable misalignment/loss of one or more control surface elements 106a, 106b, 106c has occurred (for example, if a skew is detected as shown in FIG. 3C), the detector 112 may be configured to provide an indication to a central computing unit within the aircraft, which in turn notifies the pilot and/or other relevant personnel of the skew/loss condition.

Figure 4:
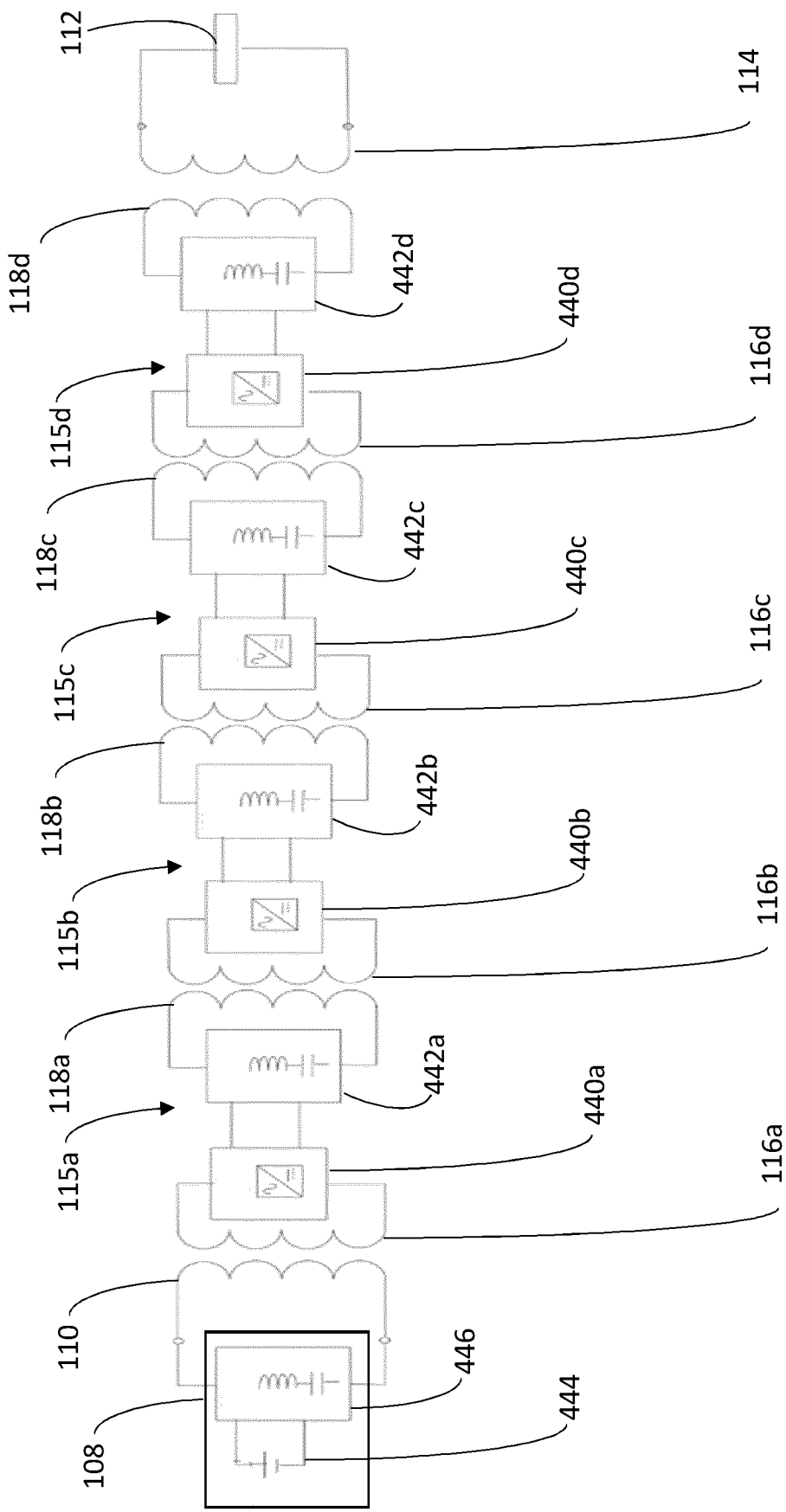
FIG. 4 shows a schematic of a control surface element monitoring system in accordance with an embodiment of the present disclosure.

FIG. 4 shows a schematic of a control surface element monitoring system 100, 200 in accordance with an embodiment of the present disclosure. In an embodiment, each control surface element signal transmission unit 115a, 115b, 115c, 115d includes rectifier circuitry 440a, 440b, 440c, 440d and "LC" resonance circuitry 442a, 442b, 442c, 442d.

The rectifier circuitry 440a, 440b, 440c, 440d for each signal transmission unit 115a, 115b, 115c, 115d is configured to rectify the voltage signal received by a respective first signal transmission unit coil 116a, 116b, 116c, 116d in that signal transmission unit 115a, 115b, 115c, 115d. By doing so, the rectifier circuitry 440a, 440b, 440c, 440d provides a DC input to corresponding LC resonance circuitry 442a, 442b, 442c, 442d.

Each LC resonance circuitry 442a, 442b, 442c, 442d, comprises the corresponding second signal transmission unit coil 118a, 118b, 118c, 118d. Each LC resonance circuitry 442a, 442b, 442c, 442d acts as an LC resonance oscillator (e.g. a "tank circuit"). For example, the LC oscillator may be a Colpitts oscillator or a Hartley oscillator. The LC resonance circuitry 442a, 442b, 442c, 442d is configured to receive a DC input signal (for example a time varying DC signal, such as a sequence of DC pulses) from the rectifier circuitry 440a, 440b, 440c, 440d. Each LC resonance circuitry 442a, 442b, 442c, 442d is configured to create an oscillating current through the second signal transmission unit coil 118a, 118b, 118c, 118d, in turn creating a time varying magnetic field at the second signal transmission unit coil 118a, 118b, 118c, 118d that induces a voltage response in the adjacent coil (either a first signal transmission unit coil 116a, 116b, 116c, 116d in an adjacent signal transmission unit 115a, 115b, 115c, 115d, or the signal receiver coil 114).

In an embodiment, the rectifier circuitry 440a, 440b, 440c, 440d includes circuitry to regulate the voltage supplied to the LC resonance circuitry 442a, 442b, 442c, 442d.

Advantageously, the provision of the LC resonance circuitry 442a, 442b, 442c, 442d acts to improve the signal strength received across gaps between adjacent control surface elements 106a, 106b, 106c or between control surface elements 106a, 106b, 106c and the fixed part 104 of the wing structure 102. In particular, the AC voltage oscillations across the second signal transmission unit coil 118a, 118b, 118c, 118d caused by applying the DC signal to the LC resonance circuitry 442a, 442b, 442c, 442d naturally settle at a frequency that causes a strong received signal in the corresponding first signal transmission unit coil 116a, 116b, 116c, 116d in an adjacent signal transmission unit 115a, 115b, 115c, 115d (or in the signal receiver coil 114 as the case may be). Thus, this arrangement creates an alternating current within a resonant system, wherein said current can be relatively high on account of it being in a resonant condition. Higher current leads to higher magnetic flux and hence better transmission across the gaps. Put differently, the system automatically tunes itself to improve inductive signal transmission across adjacent coils.

Similarly, in an embodiment, the signal generator 108 includes a DC source 444 coupled to an LC resonance circuit 446. The LC resonance circuit 446, combined with the signal transmitter coil 110 also forms an LC resonance oscillator/tank circuit (such as a Colpitts oscillator or a Hartley oscillator). In combination, the DC source 444, the LC resonance circuit 446 and the signal transmitter coil 110 are configured to provide an AC signal for transmission to a first signal transmission unit 115a, 115b, 115c, 115d in the sequence.

Figure 5:
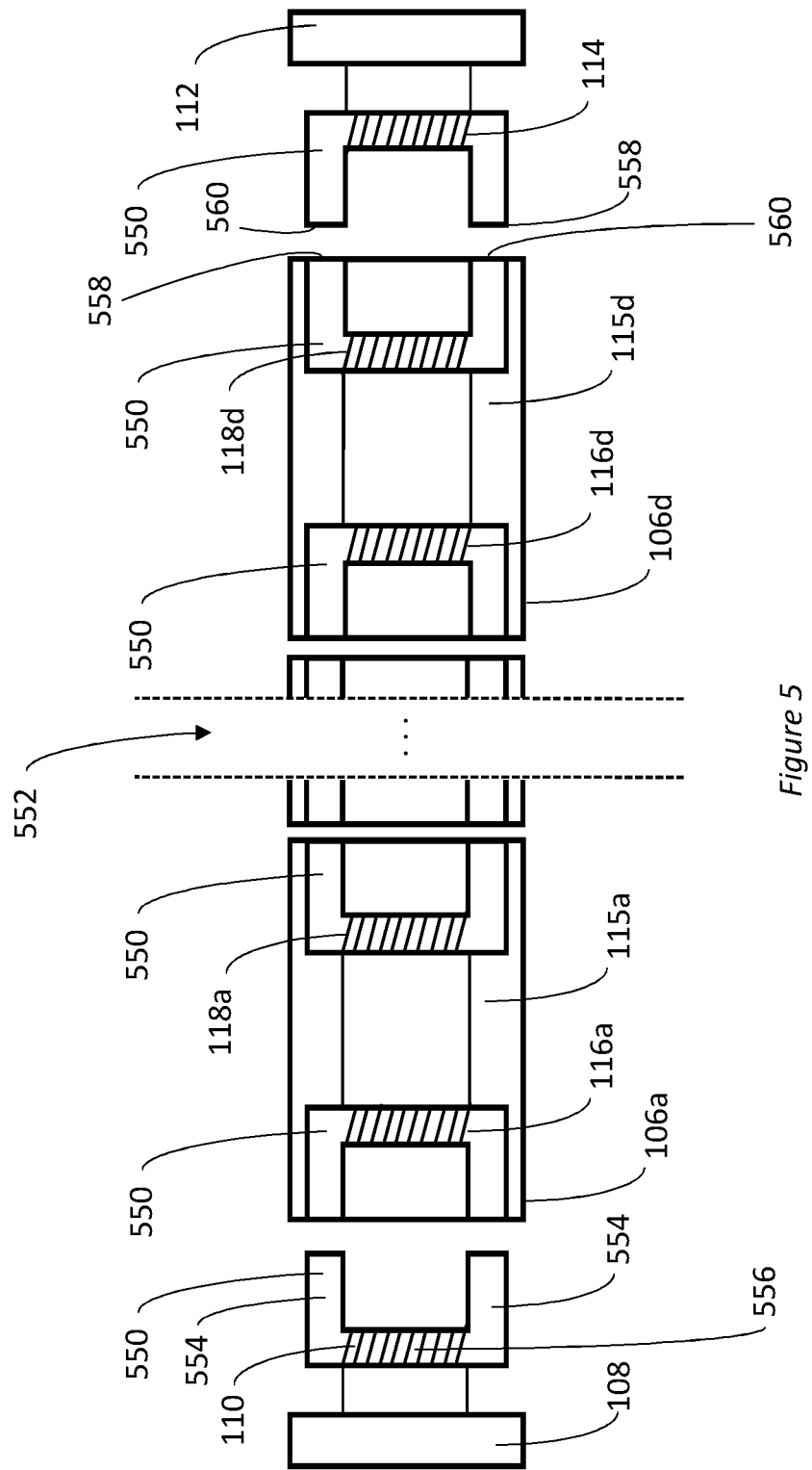
FIG. 5 shows an embodiment of the control surface element monitoring system.

FIG. 5 shows a schematic of an embodiment of the system 100, 200. FIG. 5 shows the first and last control surface elements 106a, 106d in a particular sequence and their associated signal transmission units 115a, 115d; however, it is envisaged that one or more further control surface elements may be provided (as indicated by reference numeral 552). Alternatively, a single control surface element 106a can be provided.

In this embodiment, one or more of the signal transmitter coil 110, first signal transmission unit coils 116a, 116d, second signal transmission unit coils 118a, 118d and the signal receiver coil 114 comprises a winding of wire, wound about a core 550 having a substantially "C"-shaped cross section. The cores 550 are fabricated from a material having a high magnetic permeability, such as a ferromagnetic or ferrimagnetic material, for example a ferrite. As shown in FIG. 5, each core 550 has two end portions 554 extending perpendicularly from a middle portion 556. However, any substantially C-shaped profile can be used, such that each core 550 has a first end 558 which direct magnetic flux across a gap between adjacent control surface elements 106a, 106b, 106c, 106d (or between a control surface element 106a, 106b, 106c, 106d and an adjacent fixed part 104 of the aircraft wing structure 102) towards a corresponding second end 560 of a core for the next coil in the sequence.

Advantageously, this substantially C-shaped profile provides enhanced flux linkage between adjacent coils in the sequence. This improvement to inductive coupling leads to stronger signal transmission across the gaps between the coils for "normal" conditions.

FIGS. 6A-6D show a different coil configuration for another embodiment of the system 100.

FIG. 6A shows a schematic perspective view of a second transmission unit coil 118, which comprises a winding of wire 660 around a core 668. The core 668 is fabricated from a material having a high magnetic permeability, such as a ferromagnetic or ferrimagnetic material, for example a ferrite.

Figure 6D:
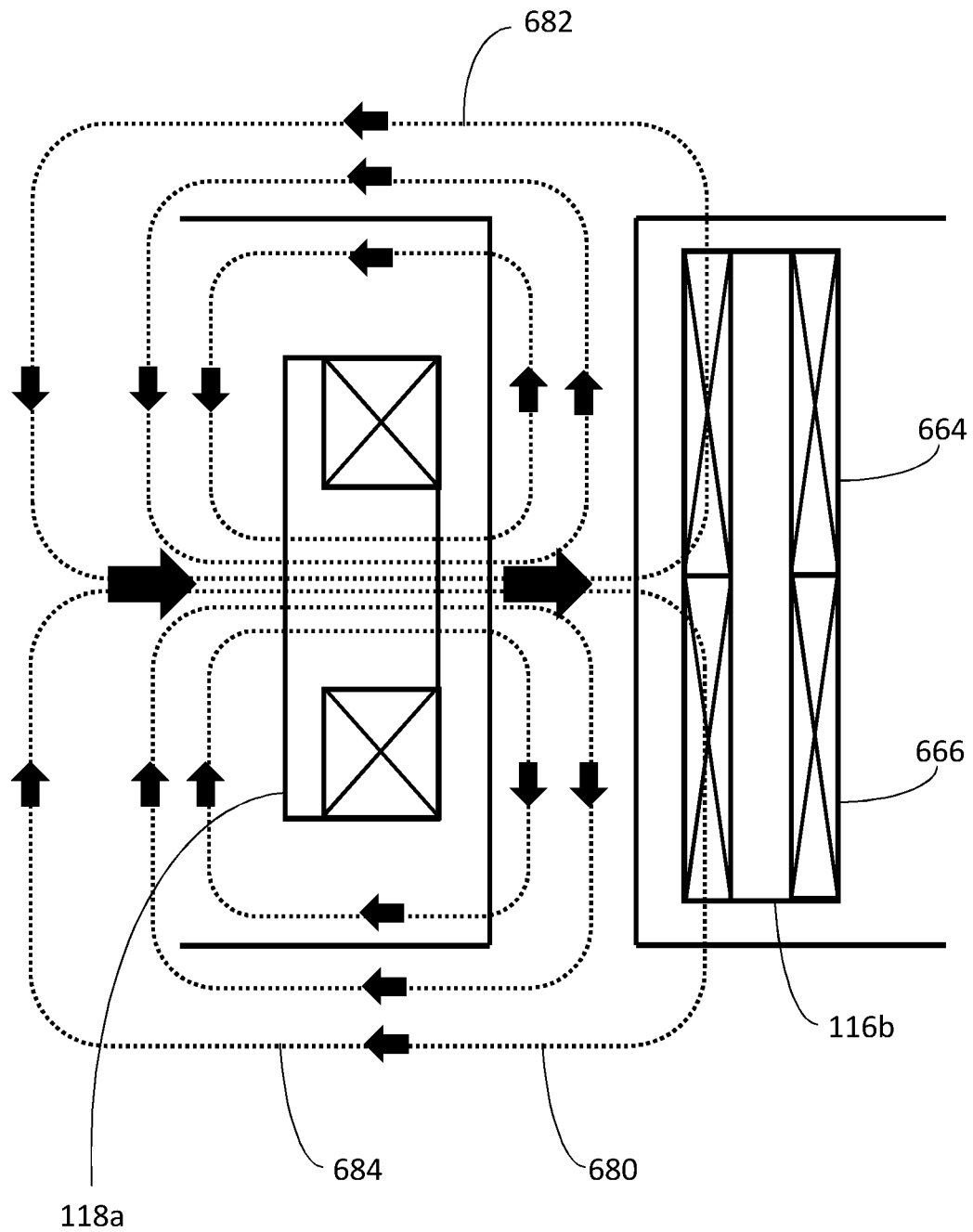

FIG. 6B shows a schematic perspective view of a first transmission unit coil 116 which comprises a winding of wire 662 around a core 670. The winding 662 comprises a first portion 664 that is wound in a first sense (e.g. clockwise) around the core 670, a point 665 at which the sense of the winding changes (e.g. from clockwise to anticlockwise), and a second portion 666 that is wound in an opposite sense to the first sense (e.g. anticlockwise). Put differently, the sense of the winding (relative to a certain direction) changes. As shown in FIG. 6B (and in FIGS. 6C-6D), there is no spatial separation between the first portion 664 and the second portion 666—optionally, the first portion 664 and second portion 666 may be spatially separated (for example by a length of substantially straight wire). In an embodiment, the core 670 is fabricated from a material having a high magnetic permeability, such as a ferromagnetic or ferrimagnetic material, for example a ferrite.

FIG. 6C shows a schematic cross section of a first transmission unit coil 116b and a second transmission unit coil 118a, of the type shown in FIGS. 6A-6B, in situ. The second transmission unit coil 118a is situated within a first control surface element 106a, and the first transmission unit coil 116b is situated within a second control surface element 106b. There is a gap 672 between the adjacent control surface elements 106a, 106b. In an embodiment, the core 668 of the second transmission unit coil 118a has a 'T'-shaped cross section. In an embodiment the first transmission unit coil 116b comprises an aluminium shield 674 proximate to a side of the winding 662 to further improve inductive performance between the adjacent coils.

The winding 660 on the second transmission unit coil 118a is wound about a portion of the respective core 668 in a particular sense (e.g. clockwise) relative to a direction along a first axis 661. The first portion 664 of the winding 662 on the first transmission unit coil 116b is wound about a section of the respective core 670 in a first sense (e.g. clockwise) relative to a direction along a second axis 663. As described above in relation to FIG. 6B, the sense of the winding 332 on the first transmission unit coil 116b changes at a point 665, after which the second portion 666 is wound in an opposite sense to the first sense (e.g. anticlockwise) relative to the direction along the second axis 663.

FIG. 6D shows the arrangement of FIG. 6C in use. An electrical signal (e.g. an AC sinusoidal voltage) is provided to the second transmission unit coil 118a in the first control surface element 106a (via the signal generator 108, signal transmitter coil 110 and first transmission unit coil 116a in the first control surface element 106a, which are omitted from FIG. 6D for clarity). At any particular moment in time, the signal causes a current to flow around the winding 660 of the second transmission unit coil 118a, thereby creating a magnetic field. FIG. 6D shows illustrative flux lines 680 at an instant in time caused by current flowing through the winding 118a. The magnetic field includes flux lines 682 having a component in the plane of the cross section of 6D that follow an anticlockwise path and flux lines 684 having a component in the plane of the cross section of 6D that follow a clockwise path.

In normal conditions (i.e. there is either no misalignment between the control surface elements 106a, 106b, or any misalignment is within predetermined acceptable operating parameters), the second transmission unit coil 118a is positioned relative to the first transmission unit coil 116b such that flux lines 682 having the anticlockwise component are coupled to the first portion 664 of the winding 662 of the first signal transmission unit coil 116b, and flux lines 684 having the clockwise component are coupled to the second portion 666. It will be appreciated that at another moment in time, the relative direction of the flux lines 680 will change, due to the time varying nature of the electrical signal. However, in a normal condition flux lines linked in the first portion 664 of the winding 662 of the first signal transmission unit coil 116b still have a substantially opposite direction to the flux lines linked in the second portion 666. Accordingly, the first portion 664 and the second portion 666 are linked to flux 682, 684 having opposite directions. Because the sense of the winding 662 in the first portion 664 is opposite to that of the second portion 666, the linked flux 682, 684 acts to induce a resultant current in the winding in one direction in the wire of the winding 662.

Although FIGS. 6A-6D have been described in relation to first transmission unit coils 116 and second transmission unit coils 118, it will be appreciated that in this embodiment the signal transmitter coil 110 and the signal receiver coil 114 may have a similar configuration. In particular, the signal transmitter coil 110 may be arranged in the same manner as the second transmission unit coils 118, and the signal receiver coil 114 may be arranged in the same manner as the first transmission unit coils 116.

Advantageously, this coil arrangement allows improved flux linkage between the second transmission unit coil 118a and the first transmission unit coil 116b. This serves to improve the received signal strength at the first transmission unit coil 116b, even over gaps 672 as large as 25 mm (approximately 1 inch) wide.

Furthermore, it has been found that AC signals inductively transmitted across coils having the arrangement shown in FIGS. 6A-6D display a characteristic response in relation to increasing skew, which further enhances skew detection.

Figure 7A:
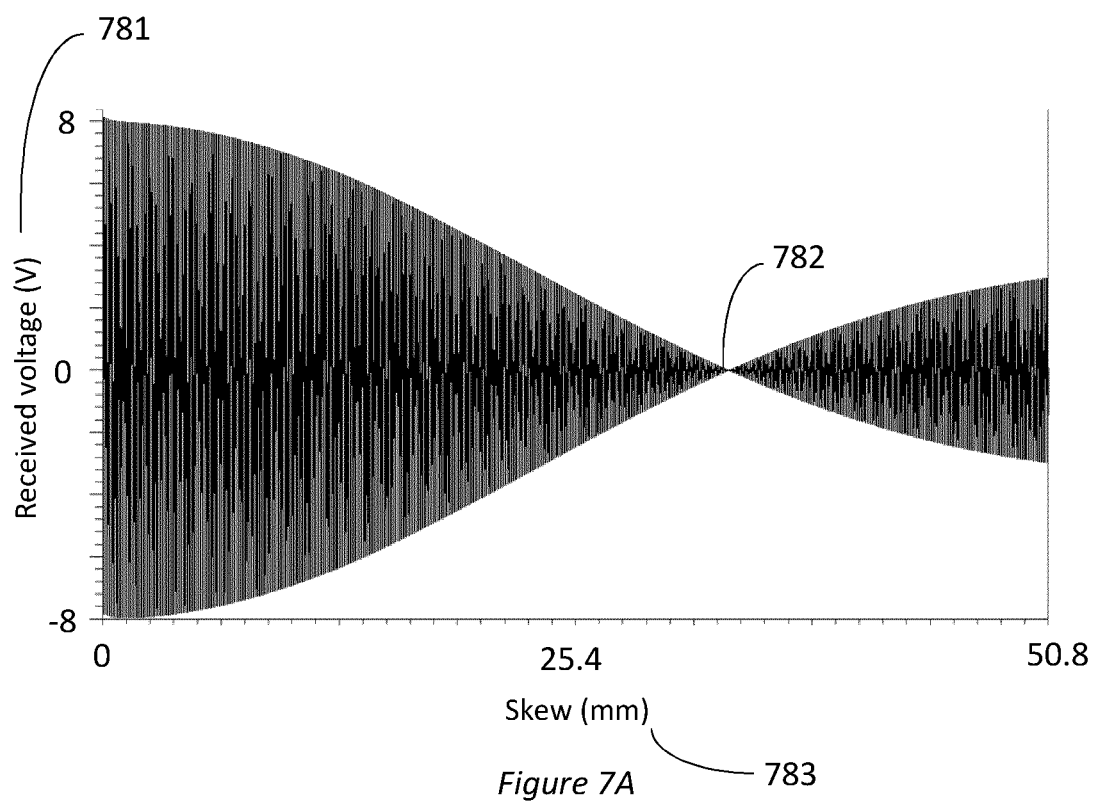
FIGS. 7A-7B show simulated induced voltage responses for coils as shown in FIGS. 6A-6D.
Figure 7B:
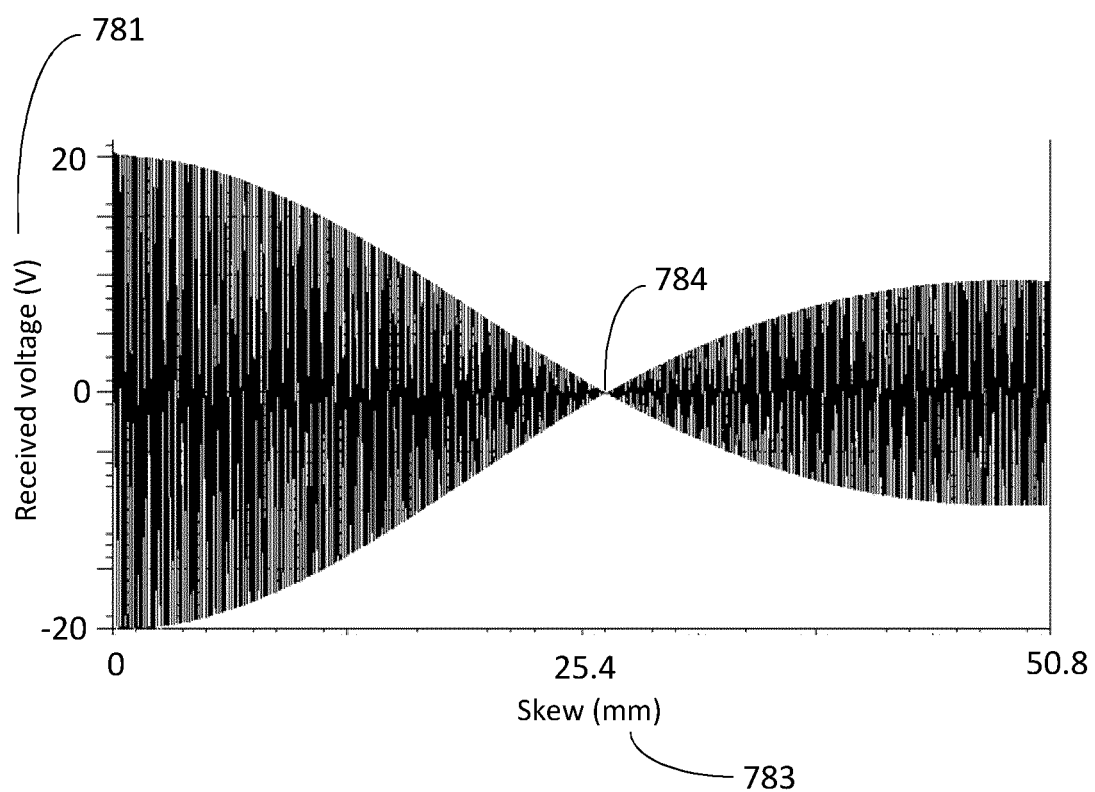
Figure 7C:
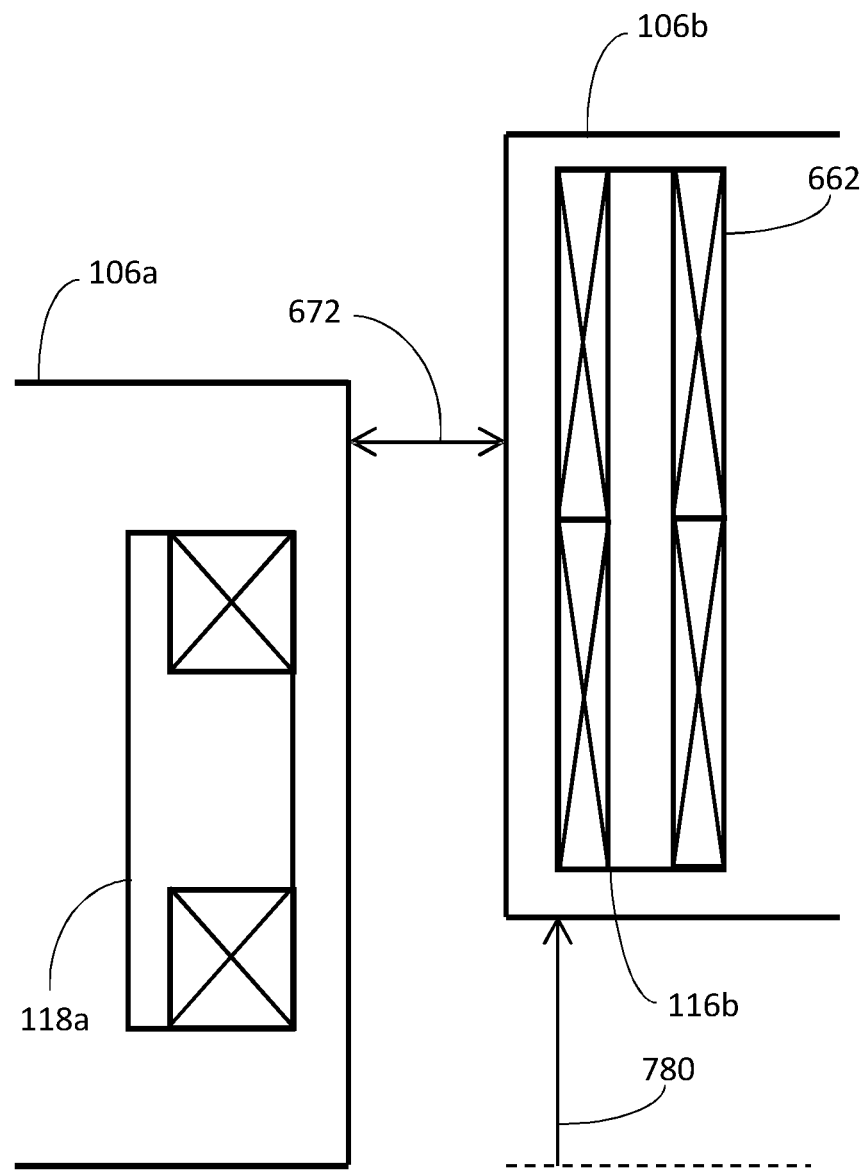
FIG. 7C shows a schematic representation of transmitting and receiving coils illustrating the skew parameter used in the simulations of FIGS. 7A and 7B.

This is demonstrated in FIGS. 7A and 7B, which show the modelled response of a coil such as the first transmission unit coil 116b in FIGS. 6B-6D to an AC signal applied to a coil such as the second transmission unit coil 118a in FIGS. 6A and 6C-6D for increasing levels of skew. In this embodiment, the modelled second transmission unit coil 118a has outer dimensions of approximately 4 inches by 2 inches by 0.6 inches, and the modelled first transmission unit coil 116b has outer dimensions of approximately 4 inches by 2 inches by 0.6 inches. For the purpose of the model, a simulated 20 V AC input signal having a frequency of 4 kHz was applied to the second transmission unit coil 118a, for increasing values of skew 783. In this embodiment, as illustrated schematically in FIG. 7C, the skew was modelled as vertical offset 780 between the coils. FIGS. 7A and 7B show the simulated peak induced voltage response 781 at the first transmission unit coil 116b as skew increases. FIG. 7A shows the results for a modelled gap 672 of 25.4 mm (1 inch) (see FIG. 7C); FIG. 7B shows the results for a modelled gap 672 of 0.51 mm (0.25 inches).

As can be seen in FIGS. 7A and 7B, at a certain amount of skew, the first transmission unit coil 116b exhibits substantially no induced voltage response (see zero points 782, 784). FIGS. 7A and 7B show the zero points 782, 784 occurring at specific points, however in some embodiments an extended deadband may be present. In some embodiments, the detector 112 can be configured to detect a transition through the zero point/deadband 782, 784, and use this transition to infer than an unacceptable degree of misalignment/skew has occurred. The amount of skew at which the zero point occurs for a given gap 672 size can be tuned by altering the dimensions of each coil (and optionally also the number of turns in the windings of each coil and/or the strength of the input signal), thus allowing the zero point to be tuned to correspond to a determined maximum acceptable amount of skew.

Furthermore, the amount of skew corresponding to the zero point 782, 784 has been found to vary little with respect to changes in the size of the gap 672. Thus, the detection of a zero point 782, 784 can be used to indicate the presence of an unacceptable level of misalignment even if the gap 672 changes by a small amount (for example due to thermal expansion/contraction during flight).

Advantageously, the existence of a zero point/deadband 782, 784 characteristic in the detected signal provides another means to determine the occurrence of skew/misalignment that can be used instead of or in addition to comparing the detected signal strength to a threshold.

In some embodiments, one or more of the coils in the system 100, 200 (i.e. one or more of the signal transmitter coil 110, first signal transmission unit coils 116a, 116d, second signal transmission unit coils 118a, 118d and the signal receiver coil 114) are arranged as described in relation to FIG. 5, while others of the coils are arranged as described in relation to FIGS. 6A-6D.

In addition, the coil arrangements described above in relation to both FIG. 5 and FIGS. 6A-6D can be combined with the additional rectifier and LC resonance circuitry described in relation to FIG. 4 above.

In any of the arrangements described above, different coils within the system 100, 200 optionally have a different number of winding turns to other coils in the system 100, 200. In particular, the number of turns of each successive coil in the chain/sequence can be greater than the preceding coil in the sequence. Advantageously, this at least partially compensates for inductive losses across gaps between adjacent coils when the control surface elements 106a, 106b, 106c are in a normal condition, by increasing the flux linkage across successive gaps, thereby increasing the received signal strength at the signal detector 112.

In one example, the control surface element monitoring system 100, 200 comprises four signal transmission units 115a, 115b, 115c, 115d, and all coils within the system 100, 200 are arranged as described above in relation to FIGS. 6A-6D. In this example, the signal transmitter coil 110 has a winding with two (2) turns, the first signal transmission unit coil 116a has a winding with ten (10) turns, the second signal transmission unit coil 118a has a winding with eleven (11) turns, the first signal transmission unit coil 116b has a winding with fifty five (55) turns, the second signal transmission unit coil 118a has a winding with sixty and a half (60.5) turns, the first signal transmission unit coil 116c has a winding with three hundred two and a half (302.5) turns, the second signal transmission unit coil 118a has a winding with three hundred thirty three (333) turns, the first signal transmission unit coil 116d has a winding with one thousand six hundred and sixty three (1663) turns, the second signal transmission unit coil 118a has a winding with one thousand eight hundred and thirty one (1831) turns, and the signal receiver coil 114 has a winding with nine thousand one hundred and sixty (9160) turns. In this example, the signal generator 108 provides a signal of 20 V AC signal, with a current of 250 A and frequency of 50 kHz.

Figure 8A:
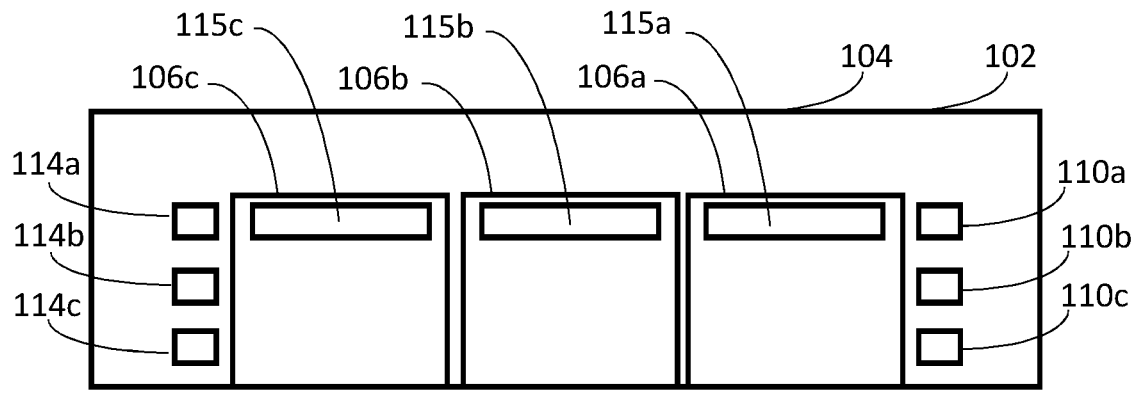
FIGS. 8A-8C show schematic top views of an aircraft wing including a control surface element monitoring system in accordance with an embodiment of the present disclosure.
Figure 8B:
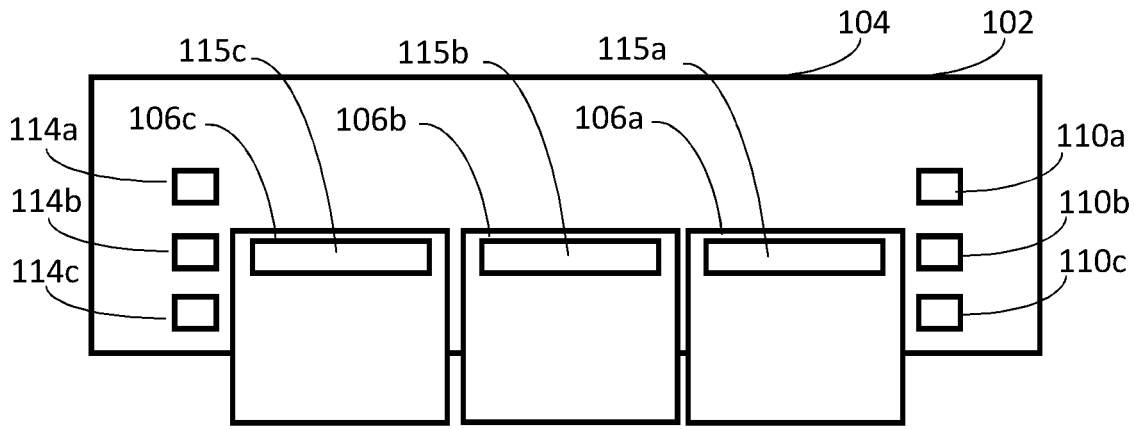
Figure 8C:
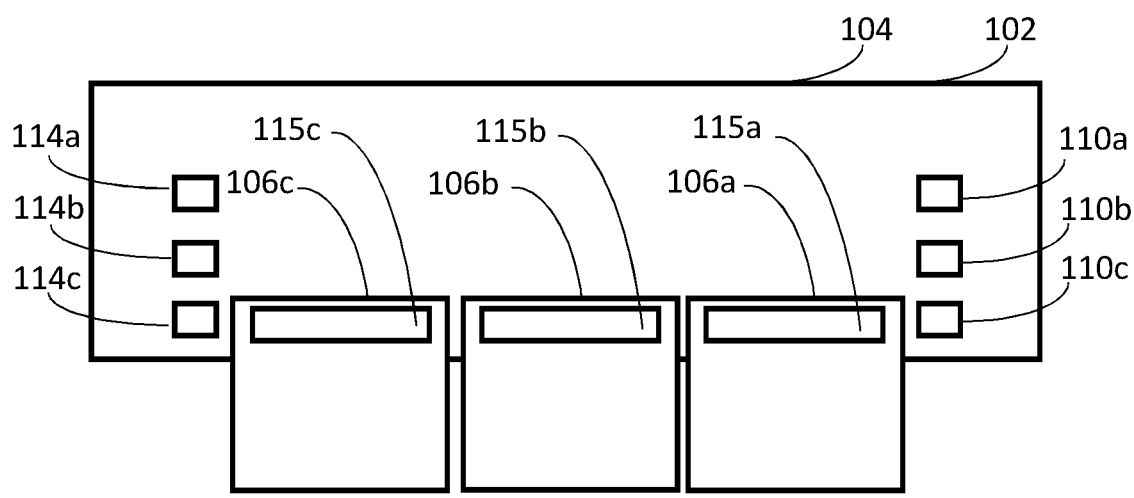

FIGS. 8A-8C show schematic top views of an aircraft wing 102 including a control surface element monitoring system 100, 200 in accordance with an embodiment of the present disclosure. In this embodiment, the system 100, 200 includes not only the features described above in relation to FIG. 1, but also includes a plurality of signal transmitter coils 110a, 110b, 110c and a plurality of signal receiver coils 114a, 114b, 114c, the locations of which correspond to different positions of the control surface elements 106a, 106b, 106c during flight. In an embodiment, the plurality of signal transmitter coils 110a, 10b, 110c are each coupled to the signal generator 108, and each of plurality of signal receiver coils 114a, 114b, 114c are coupled to the signal detector 112. Advantageously, this arrangement allows the condition of the control surface elements 106a, 106b, 106c to be monitored at different stages of deployment, as described below.

FIG. 8A shows control surface elements 106a, 106b, 106c in a fully retracted position. In the case that the control surface elements 106a, 106b, 106c are slats or flaps, the fully retracted position may correspond to a position during normal flight. A first signal transmitter coil 110a and a first signal receiver coil 114a are positioned on the fixed part 104 of the wing structure 102, such that, in the fully retracted position: the first signal transmitter coil 110a is inductively coupled to the signal transmission unit 115a of a first control surface element 106a in the sequence, and the first signal receiver coil 114a is inductively coupled to the signal transmission unit 115c of a last control surface element 106c in the sequence. In the fully retracted position, the signal generator 108 provides a signal to the first signal transmitter coil 110a, which (in normal conditions) is transmitted across the signal transmission units 115a, 115b, 115c to the first signal receiver coil 114a. The first signal receiver coil 114a provides its received signal to the detector 112.

FIG. 8B shows control surface elements 106a, 106b, 106c in an intermediate, partially extended position. In the case that the control surface elements 106a, 106b, 106c are slats or flaps, the partially extended position may correspond to a position during take-off (for example a slat sealed position configuration). A second signal transmitter coil 110b and a second signal receiver coil 114b are positioned on the fixed part 104 of the wing structure 102, such that, in the intermediate, partially extended position: the second signal transmitter coil 110b is inductively coupled to the signal transmission unit 115a of the first control surface element 106a in the sequence, and the second signal receiver coil 114b is inductively coupled to the signal transmission unit 115c of the last control surface element 106c in the sequence. In the intermediate position, the signal generator 108 provides a signal to the second signal transmitter coil 110b, which (in normal conditions) is transmitted across the signal transmission units 115a, 115b, 115c to the second signal receiver coil 114b. The second signal receiver coil 114b provides its received signal to the detector 112.

FIG. 8C shows control surface elements 106a, 106b, 106c in fully extended position. In the case that the control surface elements 106a, 106b, 106c are slats or flaps, the fully extended position may correspond to a position during landing (for example a slat gapped position configuration). A third signal transmitter coil 110c and a third signal receiver coil 114c are positioned on the fixed part 104 of the wing structure 102, such that, in the fully extended position: the third signal transmitter coil 110c is inductively coupled to the signal transmission unit 115a of the first control surface element 106a in the sequence, and the third signal receiver coil 114c is inductively coupled to the signal transmission unit 115c of the last control surface element 106c in the sequence. In the fully extended position, the signal generator 108 provides a signal to the third signal transmitter coil 110c, which (in normal conditions) is transmitted across the signal transmission units 115a, 115b, 115c to the third signal receiver coil 114c. The third signal receiver coil 114c provides its received signal to the detector 112.

Consequently, the condition of the control surface elements 106a, 106b, 106c can be effectively monitored at various different stages of deployment.

Although FIGS. 8A-8C show three signal transmitter coils 110a, 10b, 110c and three signal receiver coils 114a, 114b, 114c, the number of signal transmitter coils 110a, 10b, 110c and three signal receiver coils 114a, 114b, 114c can be any number corresponding to the number of stages of deployment at which it is desired to monitor the control surface elements 106a, 106b, 106c. For example, two signal transmitter coils and two signal receiver coils can be provided if the condition of the control surface elements 106a, 106b, 106c is to be monitored at two stages of deployment. Similarly, more than three signal transmitter coils and more than three signal receiver coils can be provided if the condition of the control surface elements 106a, 106b, 106c is to be monitored at more than three stages of deployment.

In the embodiment shown in FIGS. 8A-8C the coils in the control surface element monitoring system 100 may be arranged either as described in relation to FIG. 5, as described in relation to FIGS. 6A-6D, or a combination thereof. The coils also optionally include the additional rectifier and LC resonance circuitry described in relation to FIG. 4.

Whilst the presently disclosed subject matter is described in relation to embodiments for monitoring the condition control surface elements, the present disclosure can equally be applied to other movable/actuable aircraft components, wherein a signal transmission unit comprising first and second transmission unit coils are provided for each moveable/actuable component, and are used to carry an electrical signal from a signal generator and transmitter coil to a signal receiver coil and detector using the principles set out above. For example, the movable/actuable component may be a door or sequence of doors.

One or more features of the embodiments described supra may be combined to create additional embodiments which are not depicted. While various embodiments of the presently disclosed subject matter have been described above, it should be understood that they have been present by way of example, and not limitation. It will be apparent to persons skilled in the relevant arts that the disclosed subject matter may be embodied in other specific forms, variations, and modifications without departing from the spirit or essential characteristics of the invention. The presently disclosed embodiments are therefore to be considered in all respects as illustrative and not restrictive.

What is claimed is:

1. An aircraft moveable element monitoring system comprising:
   a signal generator;
   a signal transmitter coil electrically connected to the signal generator;
   a signal detector;
   a signal receiver coil electrically connected to the signal detector;
   one or more moveable element signal transmission units comprising a first signal transmission unit coil and a second signal transmission unit coil, the first signal transmission unit coil being electrically connected to the second signal transmission unit coil;
   the one or more moveable element signal transmission units configured to be installed on a respective moveable element of an aircraft;
   the signal transmitter coil, the one or more moveable element signal transmission units and the signal receiver coil forming an inductively coupled transmission line;
   the signal generator configured to provide an electrical signal to the signal transmitter coil and the signal detector configured to detect the electrical signal via the signal receiver coil;
   the signal detector configured to determine a condition of the one or more moveable elements by comparing the detected electrical signal to a predetermined signal characteristic; and
   the predetermined signal characteristic including at least one of: a peak voltage; a peak root mean squared voltage; a voltage profile over time; and an original phase of the electric signal produced by the signal generator.

2. The aircraft moveable element monitoring system of claim 1, wherein:
   a first signal transmission unit coil of a first moveable element signal transmission unit is positioned such that the first signal transmission unit coil is inductively coupled with the signal transmitter coil; and
   a second signal transmission unit coil of the first moveable element signal transmission unit is positioned such that the second signal transmission unit coil is inductively coupled with a first signal transmission unit coil of a second moveable element signal transmission unit, whereby the inductively coupled transmission line is formed.

3. The aircraft moveable element monitoring system of claim 2, wherein the first and second moveable element signal transmission units are installed on adjacent moveable elements.

4. The aircraft moveable element monitoring system of claim 1, wherein:
   a first signal transmission unit coil of a first moveable element signal transmission unit is positioned such that the first signal transmission unit coil is inductively coupled with a second signal transmission unit coil of a second moveable element signal transmission unit; and
   a second signal transmission unit coil of the first moveable element signal transmission unit is positioned such that the second signal transmission unit coil is inductively coupled with the signal receiver coil, whereby the inductively coupled transmission line is formed.

5. The aircraft moveable element monitoring system of claim 1, wherein:
   a first signal transmission unit coil of a first moveable element signal transmission unit is positioned such that the first signal transmission unit coil is inductively coupled with the signal transmitter coil; and
   a second signal transmission unit coil of the first moveable element signal transmission unit is positioned such that the second signal transmission unit coil is inductively coupled with the signal receiver coil, whereby the inductively coupled transmission line is formed.

6. The aircraft moveable element monitoring system of claim 1, wherein the signal transmitter coil is configured for installation on a fixed part of an aircraft.

7. The aircraft moveable element monitoring system of claim 1, wherein the signal receiver coil is configured for installation on a fixed part of an aircraft.

8. The aircraft moveable element monitoring system of claim 1, wherein the signal detector is configured to determine whether at least one of the one or more moveable elements is missing by comparing the detected electrical signal to the predetermined signal characteristic.

9. The aircraft moveable element monitoring system of claim 1, wherein the signal detector is configured to determine whether at least one of the one or more moveable elements is in a skew condition by comparing the detected electrical signal to the predetermined signal characteristic.

10. The aircraft moveable element monitoring system of claim 1, wherein:
    the signal receiver coil comprises a winding of wire; and
    the winding of wire comprises a first portion in which the wire is wound in a clockwise sense about a first axis in a first direction, and a second portion in which the wire is wound in an anticlockwise sense relative to the first axis in the first direction.

11. The aircraft moveable element monitoring system of claim 1, wherein:
    the first signal transmission unit coil comprises a winding of wire;
    the winding of wire comprises a first portion in which the wire is wound in a clockwise sense about a first axis in a first direction, and a second portion in which the wire is wound in an anticlockwise sense relative to the first axis in the first direction; and
    at least one of the signal transmitter coil and the second signal transmission unit coil comprises wire wound about a second axis, the second axis substantially perpendicular to the first axis.

12. The aircraft moveable element monitoring system of claim 1, wherein:
    at least one of the signal receiver coil, the signal transmitter coil, the first signal transmission unit coil, and the second signal transmission unit coil comprises a core; and
    the core has a substantially C-shaped profile.

13. The aircraft moveable element monitoring system of claim 1, wherein the one or more moveable element signal transmission units further comprise:
    a rectification circuit, wherein the rectification circuit is configured to rectify an electrical input from the first signal transmission unit coil; and
    an LC resonance oscillator circuit, wherein the LC resonance oscillator circuit is configured to receive and modify the rectified electrical input so as to provide an oscillating electrical output to the second signal transmission unit coil.

14. The aircraft moveable element monitoring system of claim 13, wherein the LC resonance oscillator circuit includes at least one of a Colpitts oscillator and a Hartley oscillator.

15. The aircraft moveable element monitoring system of claim 1 wherein:
    at least one moveable element signal transmission unit further comprises a capacitor connected to the first signal transmission unit coil and the second signal transmission unit coil; and
    the signal generator is configured such that the provided electrical signal has a frequency corresponding to a resonant frequency of the at least one moveable element signal transmission unit.

16. The aircraft moveable element monitoring system of claim 1, further comprising:
    a second signal transmitter coil;
    a second signal receiver coil;
    the signal transmitter coil and the signal receiver coil configured for installation on a fixed part of an aircraft at locations corresponding to a first moveable element configuration; and
    the second signal transmitter coil and the second signal receiver coil configured for installation on the fixed part of an aircraft at locations corresponding to a second moveable element configuration.

17. The aircraft moveable element monitoring system of claim 16, wherein the one or more moveable element signal transmission units are located in a control surface element.

18. The aircraft moveable element monitoring system of claim 17, wherein:
    the control surface elements each comprise a slat;
    the first moveable element configuration corresponds to a retracted position of the slats; and
    the second moveable surface element configuration corresponds to a sealed position configuration of the slats and/or a gapped position configuration of the slats.

19. An aircraft including an aircraft control surface element system, the aircraft control surface element system comprising:
    an aircraft wing structure having a fixed part and a control surface element;
    the control surface element is operably moveable relative to the fixed part;
    a signal generator;
    a signal transmitter coil electrically connected to the signal generator;
    a signal detector;
    a signal receiver coil electrically connected to the signal detector;

a signal transmission unit located in the control surface element;

the signal transmission unit comprising comprises a first coil and a second coil, the first coil being electrically connected to the second coil;

the signal transmitter coil, the signal transmission unit and the signal receiver coil forming at least a portion of an inductively coupled transmission line;

the signal generator operable to provide an electrical signal to the signal transmitter coil and the signal detector is configured to detect the electrical signal via the signal receiver coil;

the signal detector is configured to determine a condition of the control surface element by comparing a detected electrical signal to a predetermined signal characteristic; and the predetermined signal characteristic including at least one of: a peak voltage; a peak root mean squared voltage; a voltage profile over time; and an original phase of the electric signal produced by the signal generator.

20. A method for determining a condition of one or more aircraft moveable elements, each of the one or more aircraft moveable elements having installed thereon a respective moveable element signal transmission unit, each moveable element signal transmission unit comprising a first signal transmission unit coil and a second signal transmission unit coil, the first signal transmission unit coil being electrically connected to the second signal transmission unit coil, wherein the method comprises the steps of:

generating, using a signal generator, an electrical signal;

providing the electrical signal from the signal generator to a signal transmitter coil;

transmitting the electrical signal from the signal generator to a signal receiver coil via an inductively coupled transmission line formed from the signal transmitter coil, the one or more moveable element signal transmission units and the signal receiver coil;

providing the electrical signal from the signal receiver coil to a signal detector;

detecting, using the signal detector, the electrical signal;

determining, using the signal detector, a condition of one or more moveable elements by comparing the detected electrical signal to a predetermined signal characteristic; and the predetermined signal characteristic including at least one of: a peak voltage; a peak root mean squared voltage; a voltage profile over time; and an original phase of the electric signal produced by the signal generator.

* * * * *